US007708666B2

(12) United States Patent
Hino

(10) Patent No.: US 7,708,666 B2
(45) Date of Patent: May 4, 2010

(54) INTERNAL TRANSMISSION HUB ASSEMBLY

(75) Inventor: Tetsuya Hino, Shimonoseki (JP)

(73) Assignee: Shimano Inc., Osaka (JP)

( * ) Notice: Subject to any disclaimer, the term of this patent is extended or adjusted under 35 U.S.C. 154(b) by 511 days.

(21) Appl. No.: 11/833,046

(22) Filed: Aug. 2, 2007

(65) Prior Publication Data

US 2009/0036261 A1 Feb. 5, 2009

(51) Int. Cl.
*F16H 3/44* (2006.01)
(52) U.S. Cl. .................................................. 475/297
(58) Field of Classification Search ............... 475/296, 475/297
See application file for complete search history.

(56) References Cited

U.S. PATENT DOCUMENTS

| | | | | |
|---|---|---|---|---|
| 5,855,530 A | * | 1/1999 | Huang et al. | 475/289 |
| 6,607,465 B1 | * | 8/2003 | Shoge | 475/297 |
| 6,641,500 B2 | * | 11/2003 | Shoge | 475/276 |
| 7,148,582 B2 | * | 12/2006 | Matsueda et al. | 290/1 C |
| 7,621,842 B2 | * | 11/2009 | Kamiya et al. | 475/296 |
| 2009/0131214 A1 | * | 5/2009 | Okoochi et al. | 475/298 |

FOREIGN PATENT DOCUMENTS

EP 1 323 627 A2 7/2003

* cited by examiner

*Primary Examiner*—Dirk Wright
(74) *Attorney, Agent, or Firm*—Global IP Counselors, LLP

(57) ABSTRACT

An internal transmission hub assembly includes a shift control sleeve, a sleeve guide and a shifting key guide. The shift control sleeve is disposed for limited circumferential movement about the axis of rotation of a stationary hub shaft. The shift control sleeve includes a base sleeve and at least one pawl control arm, the base sleeve having a first end and a second end. The sleeve guide supports the first end of the base sleeve of the shift control sleeve about the stationary hub shaft. The first end of the base sleeve is welded to the sleeve guide. The shifting key guide supports the second end of the base sleeve of the shift control sleeve about the stationary hub shaft. The second end of the base sleeve is welded to the shifting key guide.

7 Claims, 17 Drawing Sheets

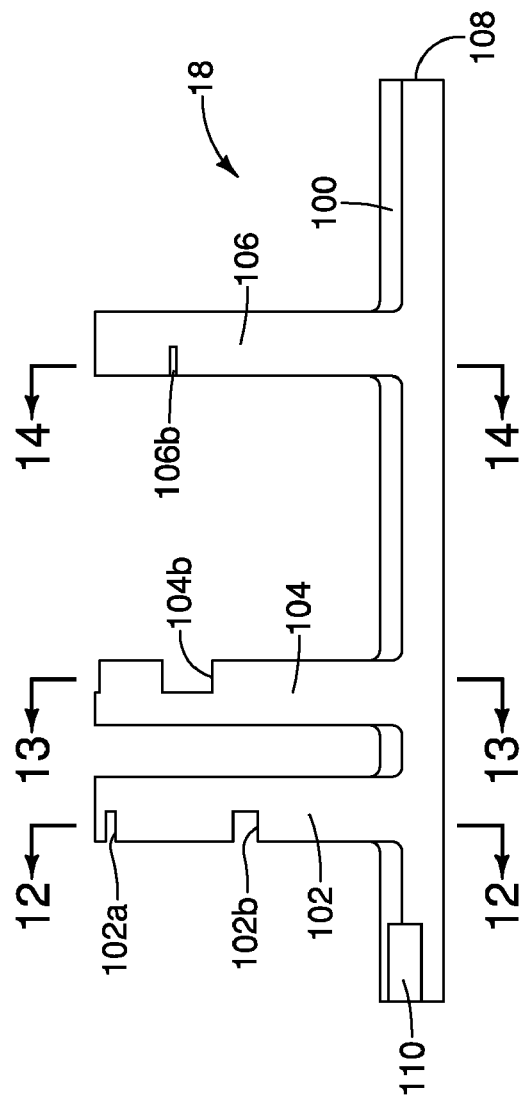
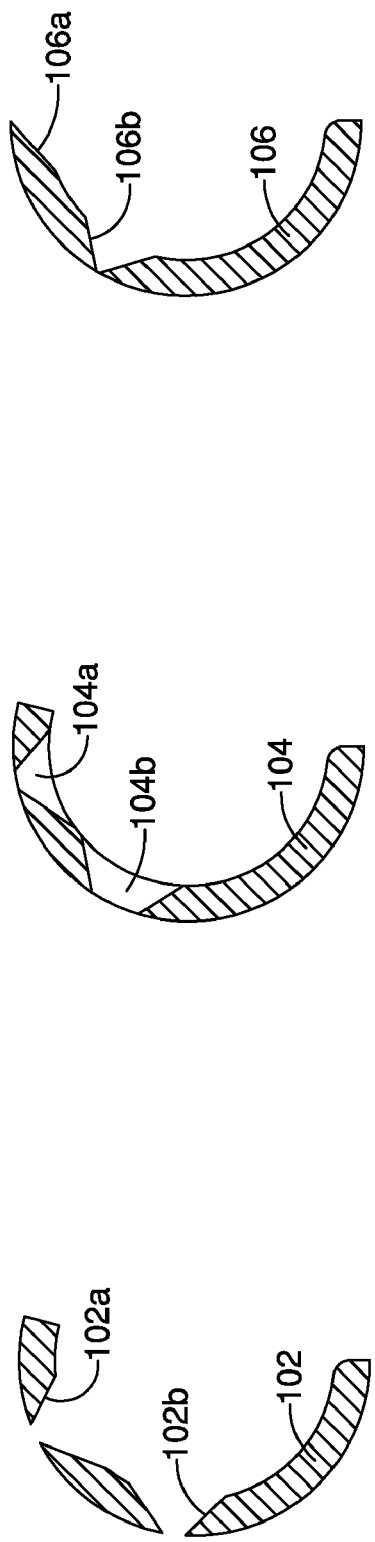
FIG. 11
FIG. 12
FIG. 13
FIG. 14

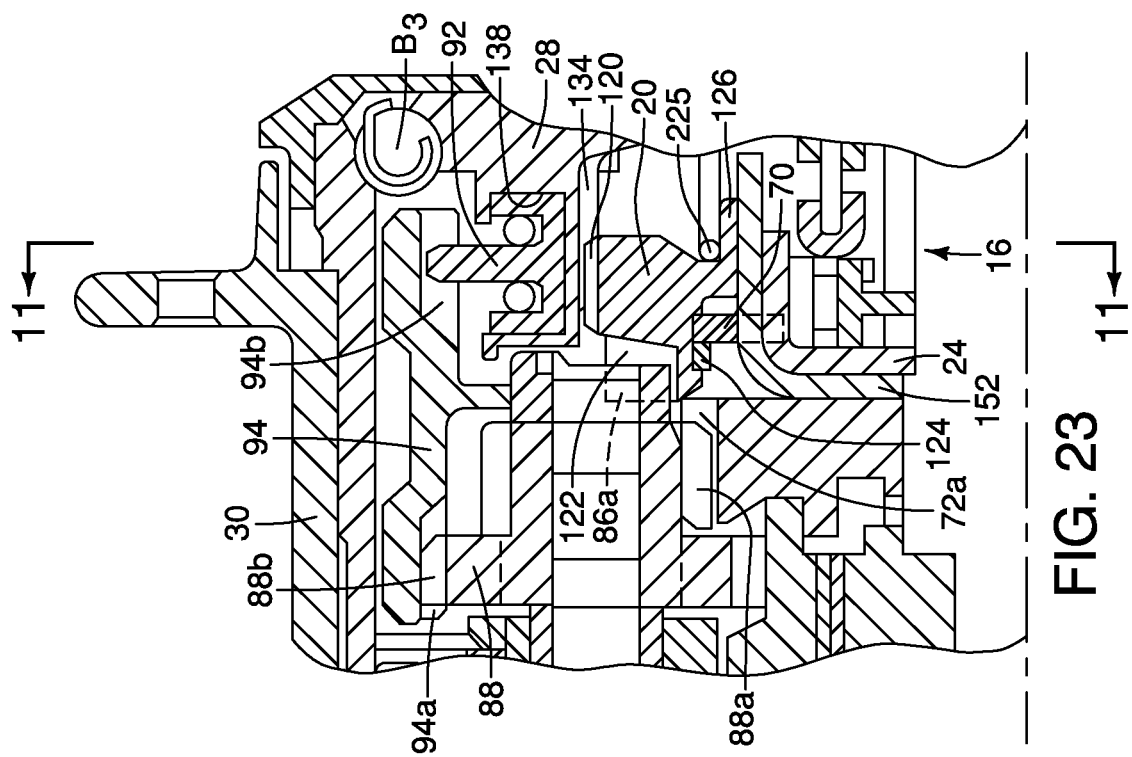

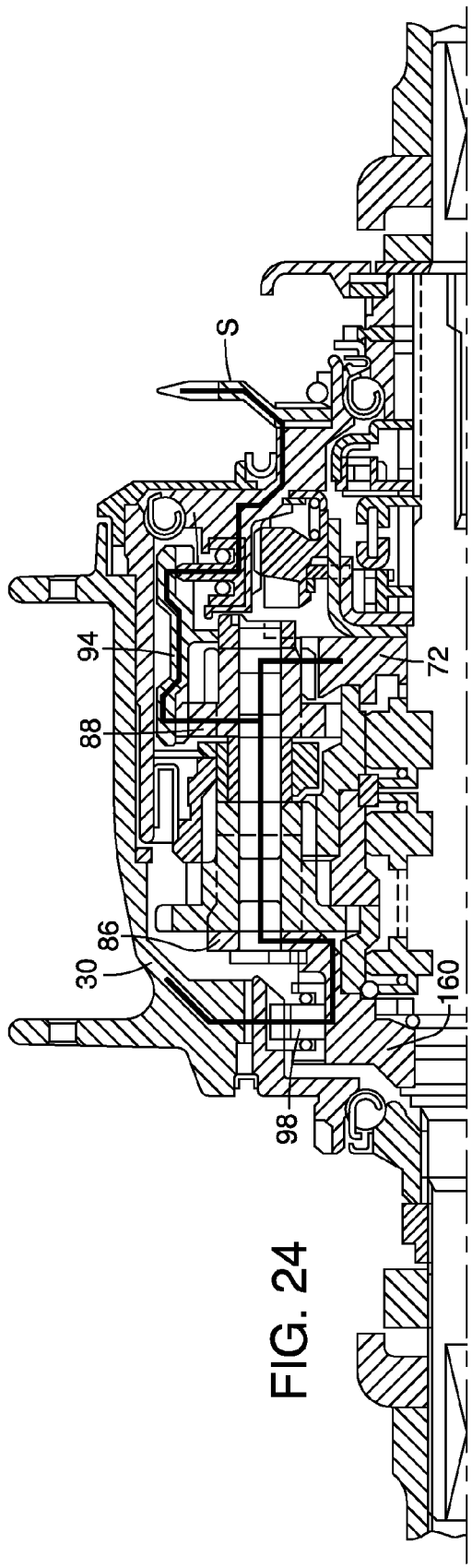
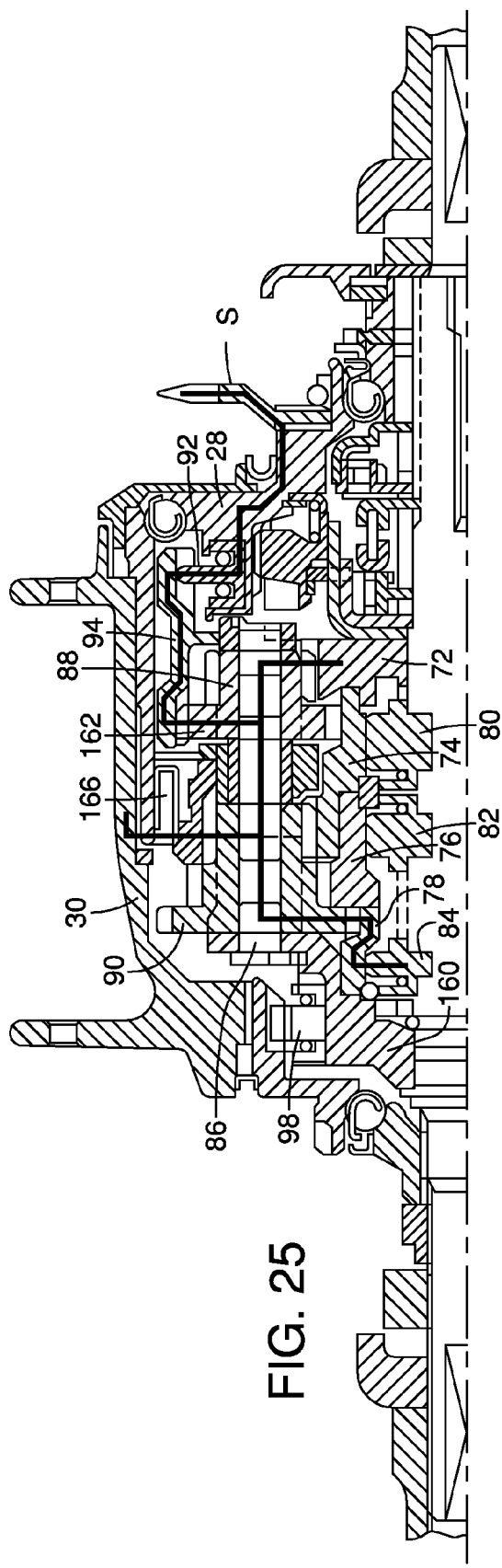

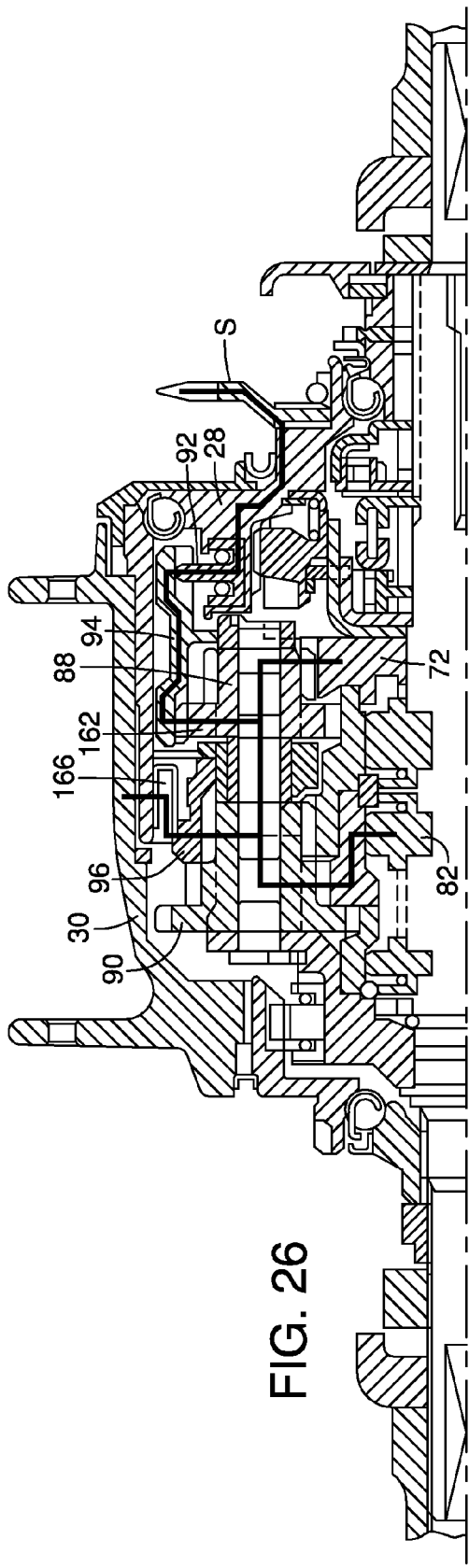
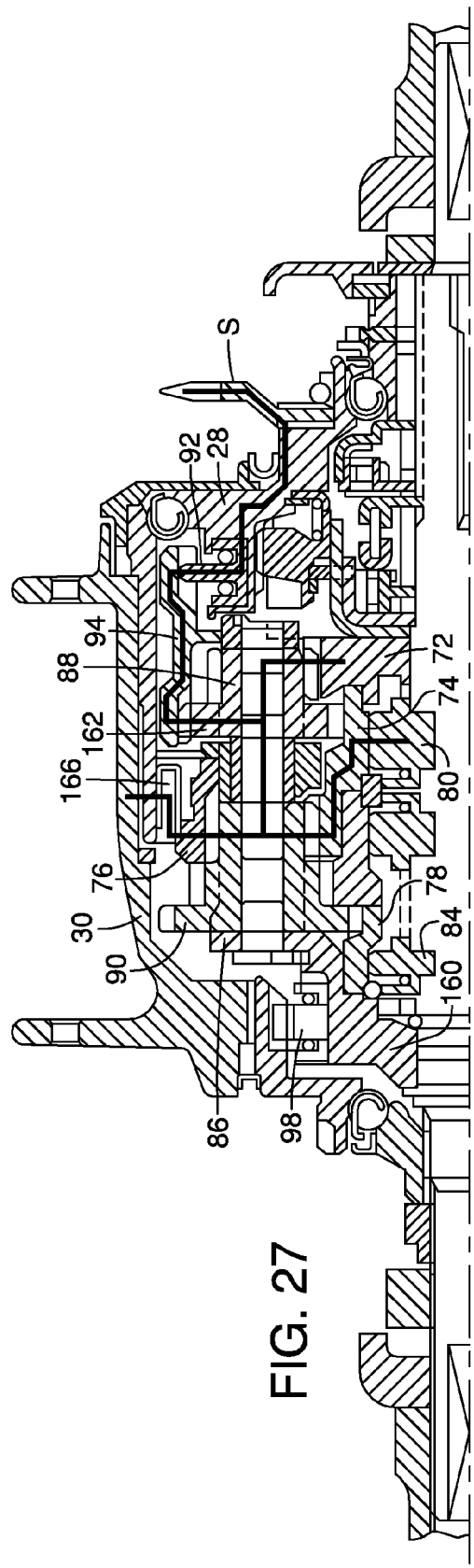
FIG. 26
FIG. 27

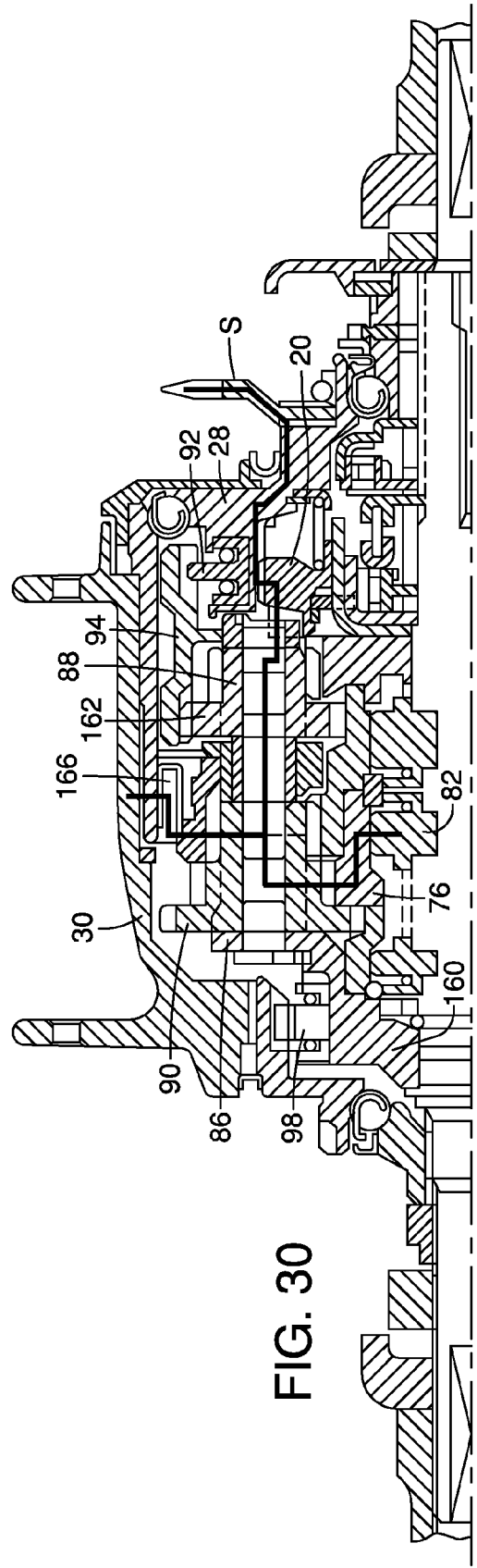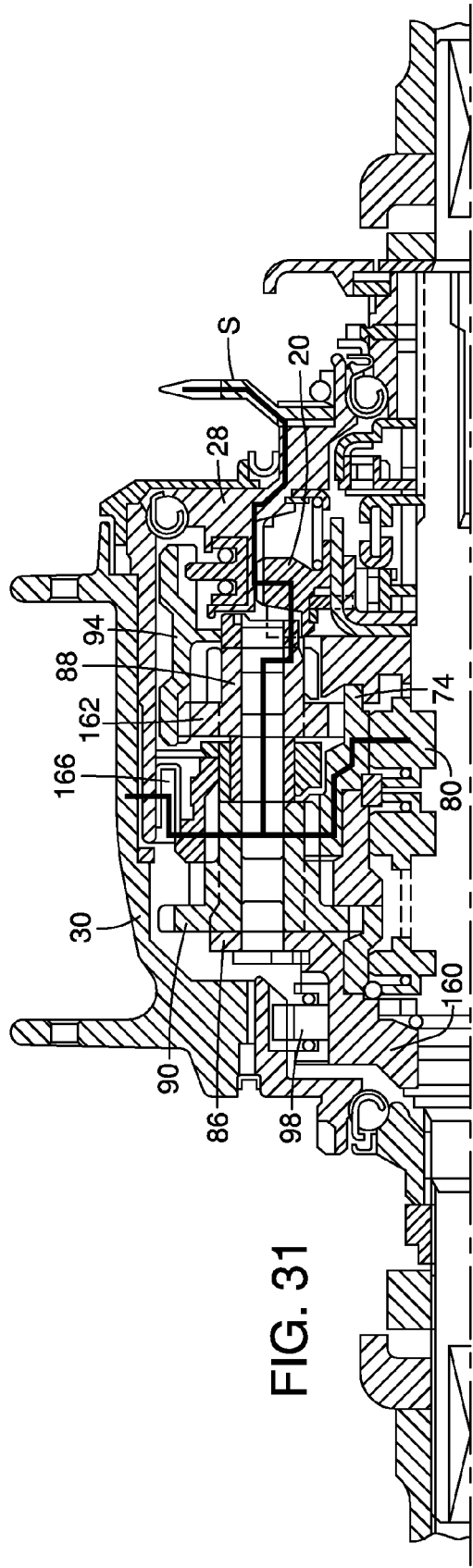

INTERNAL TRANSMISSION HUB ASSEMBLY

BACKGROUND OF THE INVENTION

1. Field of the Invention

This invention generally relates to an internal transmission hub assembly. More specifically, the present invention relates to an internal transmission hub assembly that includes a shift control sleeve (a pawl control member).

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle internal transmission hub assembly.

The internal transmission hub assembly is typically a rear wheel hub that includes an internal gearing mechanism that includes elements that can be shifted to provide a plurality of power transmission paths (gear ratios) for a cyclist.

With such an internal transmission hub assembly, a cyclist changes pedaling speeds by manipulating a conventional lever actuating shifting mechanism installed on or adjacent to the handlebars of the bicycle. Movement of the lever actuating shifting mechanism is transmitted to the internal transmission hub assembly by a Bowden-type cable that is operably connected to a shift mechanism within the internal transmission hub assembly. Changes in the position of the lever actuating shifting mechanism cause movement of various elements of the shift mechanism within the internal transmission hub assembly that ultimately determine the selection of a power transmission path (gear ratio).

The shift mechanism of the internal transmission hub assembly typically includes a shifting key guide, shift control sleeve (a pawl control member) and a sleeve guide. The shift control sleeve is pivoted about a stationary hub axle within the internal transmission hub assembly by the various elements of the shift mechanism of the internal transmission hub assembly.

The shift control sleeve (pawl control member) typically includes a base sleeve and one or more arcuately shaped control sleeves. The base sleeve typically extends in an axial direction along side a stationary hub axle with a first end and a second end. The first end of the base sleeve typically extends through an opening in the shifting key guide. Typically, no mechanical fastening is provided between the first end of the base sleeve and the shifting key guide. Specifically, the first end of the base sleeve extends through the opening in the shifting key guide. Consequently, the base sleeve is moved is a circumferential direction about the stationary hub axle by rotational movement of the shifting key guide. The control sleeves of the shift control sleeve (the pawl control member) are configured to engage and dis-engage pawls that selectively engage sun gears within the internal transmission hub assembly. The pawls act as one-way clutches to selectively stop rotation of the sun gears in one direction.

Typically, the second end of the base sleeve of the shift control sleeve (pawl control member) is confined in a recess formed in a sleeve guide that is also rotatably installed on the stationary hub axle of the internal transmission hub assembly. Typically, no mechanical fastening is provided between the second end of the base sleeve and the sleeve guide. Hence, the base sleeve of the pawl control member, the sleeve guide and the shift key guide move about the stationary hub axle as a single unit.

A problem with the base sleeve of the pawl control member, the sleeve guide and the shift key guide is that there can be minute amounts of play or slight relative movement between these elements. As with any mechanical device, play or slight relative movement between mechanically connected elements is undesirable. Over time, a loose or sloppy feel can be notice by a cyclist when shifting between power transmission path.

In one internal transmission hub assembly design disclosed in EP Patent Application Number 1,323,627, the second end of the base sleeve of the pawl control member is caulked or crimped within the recess of the sleeve guide, thereby initially eliminating play between the base sleeve and the sleeve guide. However, over time and extensive usage, play between the base sleeve and the sleeve guide may develop. Further the configuration disclosed in EP Patent Application Number 1,323,627 does not address the elimination of play between the shift key guide and the base sleeve of the pawl control member.

In view of the above, it will be apparent to those skilled in the art from this disclosure that there exists a need for an improved internal transmission hub assembly that reduces or eliminates play between the base sleeve and the sleeve guide, and the shift key guide and the base sleeve of the shift control sleeve (the pawl control member). This invention addresses this need in the art as well as other needs, which will become apparent to those skilled in the art from this disclosure.

SUMMARY OF THE INVENTION

One object of the present invention is to provide an internal transmission hub assembly with features that reduce or eliminate play or slight relative movement between elements of the shifting mechanism within the internal transmission hub assembly.

The foregoing objects can basically be attained by providing an internal transmission hub assembly with a stationary hub shaft, a shift control sleeve, a sleeve guide and a shifting key guide. The stationary hub shaft is configured to non-rotatably attach to a bicycle frame. The stationary hub shaft defines an axis of rotation. The shift control sleeve is disposed adjacent to the stationary hub shaft for limited circumferential movement relative to the stationary hub shaft about the axis of rotation. The shift control sleeve is also configured to control operation of at least one sun gear disposed about the stationary hub shaft. The shift control sleeve includes a base sleeve and at least one pawl control arm. The base sleeve further has a first end and a second end. The sleeve guide is rotatably disposed about a first portion of the stationary hub shaft. The sleeve guide supports the first end of the base sleeve of the shift control sleeve. The first end of the base sleeve is welded to the sleeve guide. The shifting key guide is rotatably disposed about a second portion of the stationary hub shaft and supports the second end of the base sleeve of the shift control sleeve. The second end of the base sleeve is welded to the shifting key guide.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 11 is a side elevational view of the pawl control member shown removed from the hub assembly showing a base sleeve and first, second and third control sleeves extending from the base sleeve in accordance with the present invention;

FIG. 12 is a cross-sectional view of the first control sleeve of the pawl control member taken along the line 12-12 in FIG. 11 showing pawl control recesses of the first control sleeve in accordance with the present invention;

FIG. 13 is a cross-sectional view of the second control sleeve of the pawl control member taken along the line 13-13 in FIG. 11 showing pawl control recesses of the second control sleeve in accordance with the present invention;

FIG. 14 is a cross-sectional view of the third control sleeve of the pawl control member taken along the line 14-14 in FIG. 11 showing pawl control recesses of the third control sleeve in accordance with the present invention;

FIG. 22 is an enlarged portion of the cross-sectional view of FIG. 2, showing a portion of the hub assembly with a clutch ring in disengaged with the first sun gear of the hub assembly in accordance with the present invention;

FIG. 23 is a cross-sectional view similar to FIG. 22, showing a portion of the hub assembly with the clutch ring engaged from the first sun gear of the hub assembly in accordance with the first embodiment of the present invention;

FIG. 24 is a cross-sectional view of a portion of the hub assembly similar to FIG. 2 showing a first power transmission path superimposed over those element of the power transmission assembly that define the first power transmission in accordance with the first embodiment of the present invention;

FIG. 25 is a cross-sectional view of a portion of the hub assembly similar to FIGS. 2 and 24 showing a second power transmission path superimposed over those element of the power transmission assembly that define the second power transmission in accordance with the first embodiment of the present invention;

FIG. 26 is a cross-sectional view of a portion of the hub assembly similar to FIGS. 2, 24 and 25 showing a third power transmission path superimposed over those element of the power transmission assembly that define the third power transmission in accordance with the first embodiment of the present invention;

FIG. 27 is a cross-sectional view of a portion of the hub assembly similar to FIGS. 2 and 24-26 showing a fourth power transmission path superimposed over those element of the power transmission assembly that define the fourth power transmission in accordance with the first embodiment of the present invention;

FIG. 30 is a cross-sectional view of a portion of the hub assembly similar to FIGS. 2 and 24-29 showing a seventh power transmission path superimposed over those element of the power transmission assembly that define the seventh power transmission in accordance with the first embodiment of the present invention; and FIG. 31 is a cross-sectional view of a portion of the hub assembly similar to FIGS. 2 and 24-30 showing an eighth power transmission path superimposed over those element of the power transmission assembly that define the eighth power transmission in accordance with the first embodiment of the present invention.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
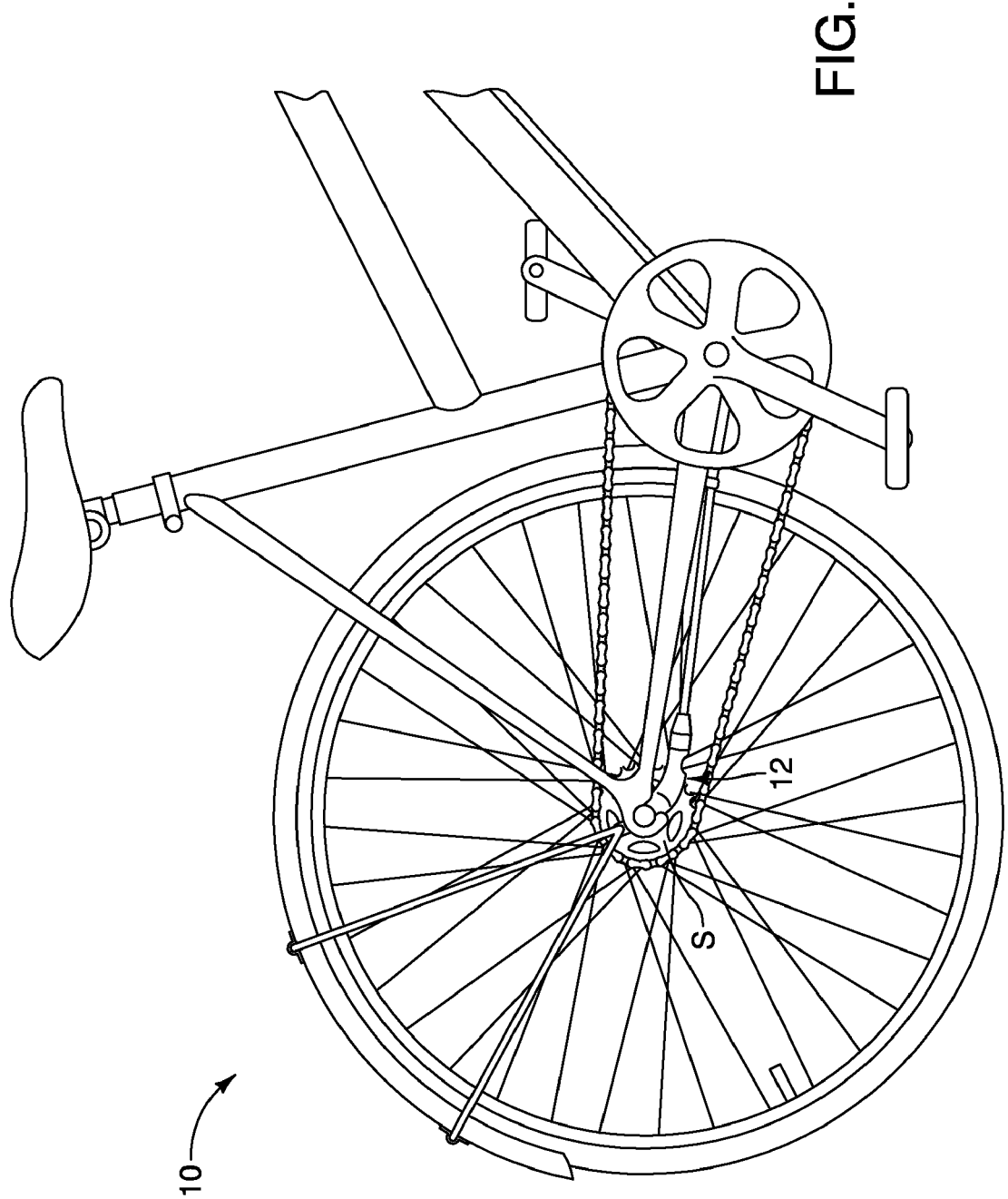
FIG. 1 is a fragmentary side elevation of a bicycle, showing a rear portion of the bicycle with a hub assembly in accordance with the present invention.

Referring initially to FIG. 1, a bicycle 10 with a hub assembly 12 is illustrated in accordance with a first embodiment of the present invention.

Figure 2:
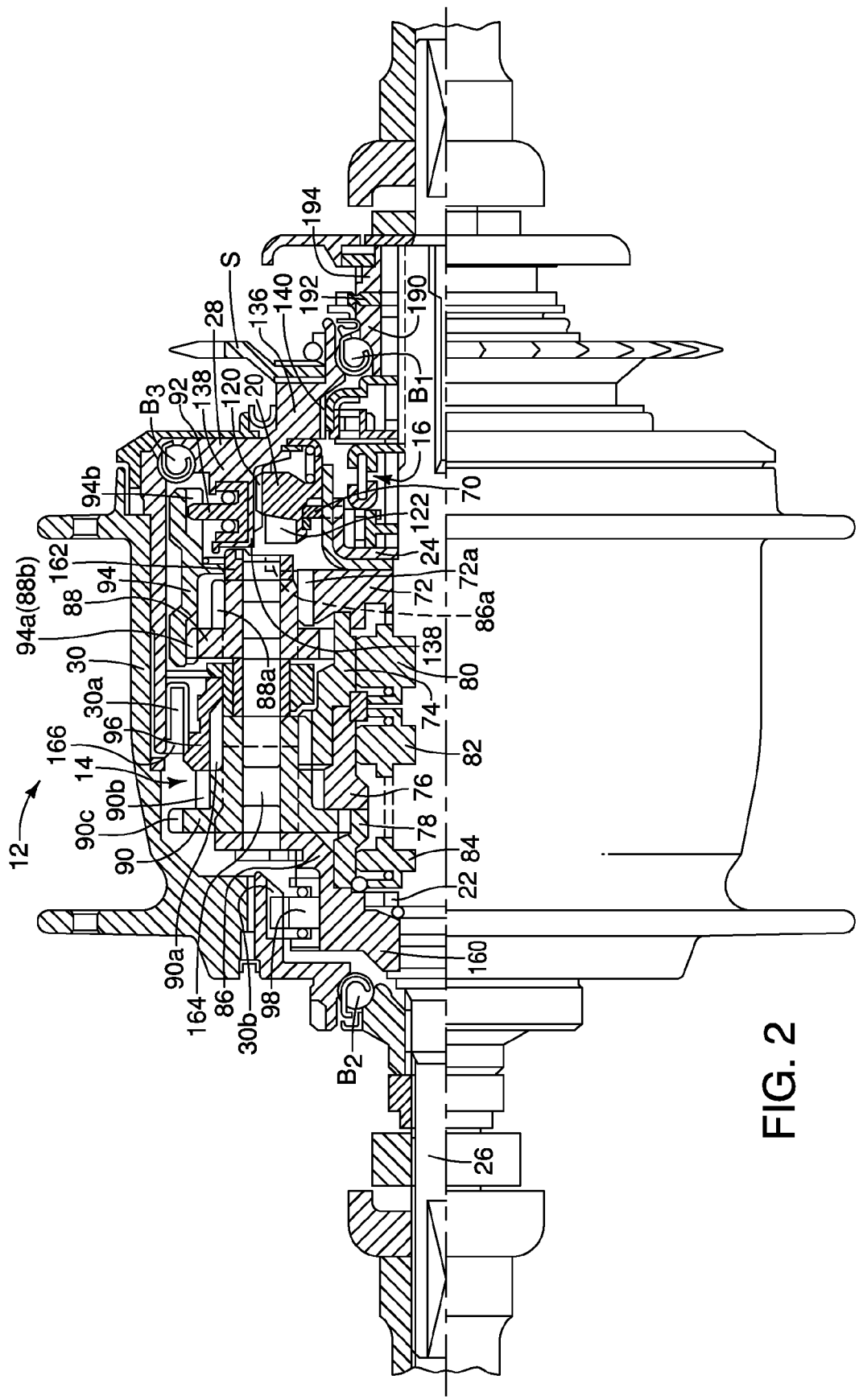
FIG. 2 is a cross-sectional view of the hub assembly showing various portions of the hub assembly including a power transmission assembly with a shift mechanism in accordance with the present invention.

As shown in FIG. 2, the hub assembly 12 includes a power transmission assembly 14 that has a shift mechanism 16 (a shift control mechanism) that controls movement of a pawl control member 18 (see FIGS. 3-6 and 8-14) and a clutch ring 20. The pawl control member 18 and the clutch ring 20 are selectively movable to a combination of positions in order to configure various elements of the power transmission assembly 14 to transmit torque along a plurality of power transmission paths indicated in FIG. 24-31 and described in greater detail below. Further, as shown in FIGS. 3, 4, 6 and 8-10, the shift mechanism 16 of present invention also includes a sleeve guide 22 (FIGS. 3, 5, 8 and 10) and a shifting key guide 24 (FIGS. 4, 6 and 9) that support the pawl control member 18 for limited movement to discreet positions corresponding to the power transmission path. In accordance with the present invention, one end of the pawl control member 18 is welded to the sleeve guide 22 and the other end of the pawl control member 18 is welded to the shifting key guide 24, as described below. By welding the sleeve guide 22 to the pawl control member 18 and the shifting key guide 24 to the pawl control member 18, play in the moving parts of the hub assembly 12 is reduced and a more consistent shifting of speeds is attained.

As shown in FIG. 2, the hub assembly 12 basically includes a hub axle 26, a driver 28, a hub shell 30, the power transmission assembly 14 and the shift mechanism 16.

With specific reference to FIGS. 3-10, a brief description of the hub axle 26 is now provided. The hub axle 26 is basically an elongated shaft that is non-rotatably mounted to the rear frame of the bicycle 10 in a conventional manner. The hub axle 26 includes shift control support portion 32 and a transmission support portion 34.

The shift control support portion 32 of the hub axle 26 has a generally uniform diameter and includes a pair of axially extending grooves 36 (only one groove 36 visible in FIGS. 3 and 4) formed in a portion thereof.

Figure 3:
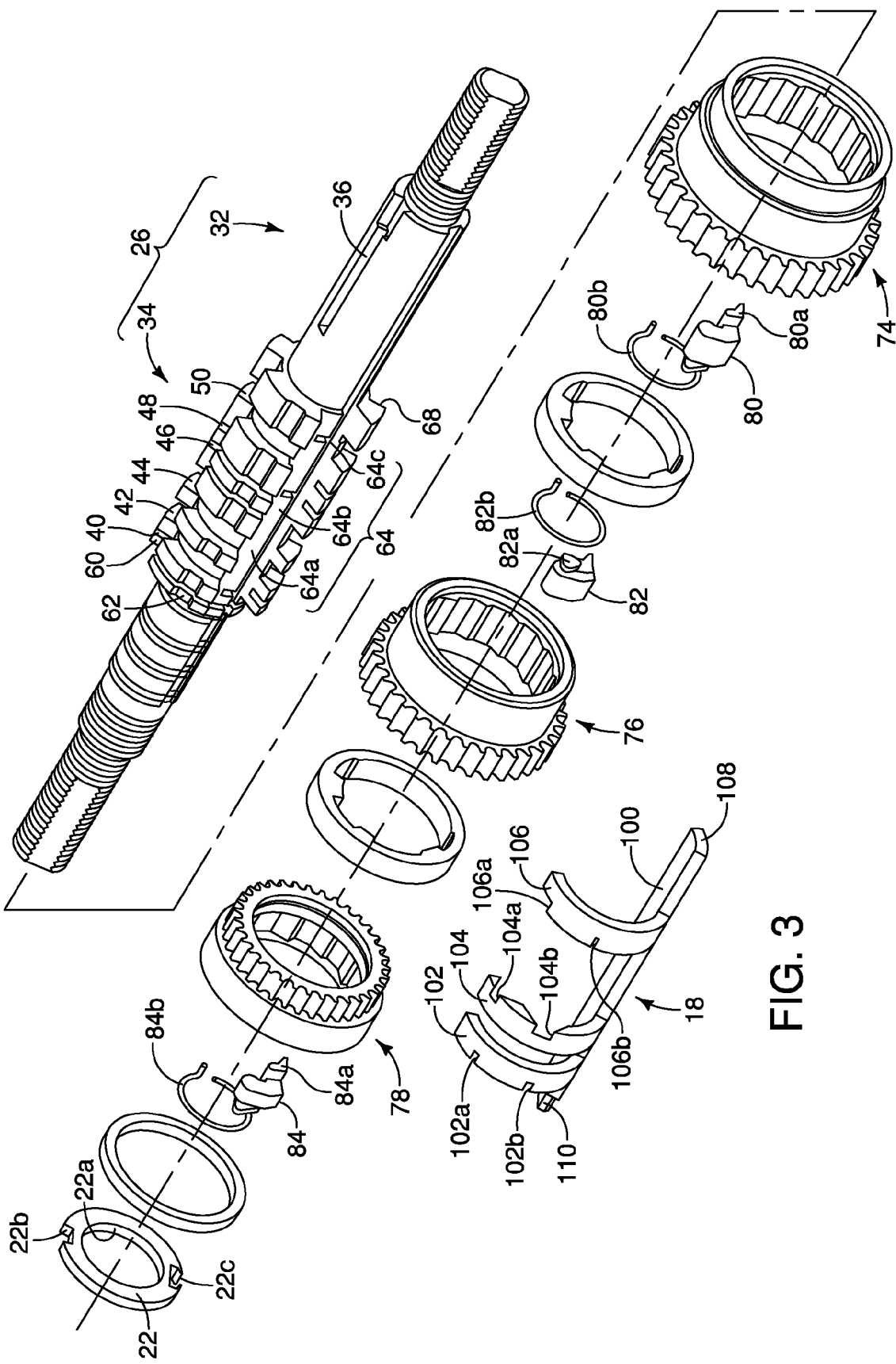
FIG. 3 is an exploded view of a portion of the hub assembly showing elements of the power transmission assembly including a hub axle, a sleeve guide, and a pawl control member with elements of the shift mechanism removed in accordance with the present invention.
Figure 8:
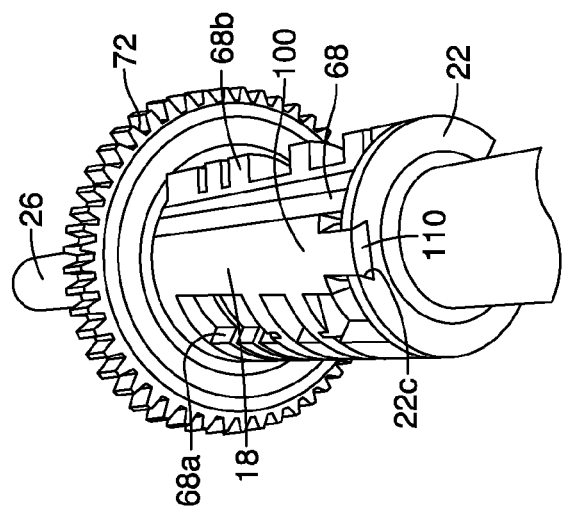
FIG. 8 is another perspective view of a portion of the hub assembly showing the hub axle, the sleeve guide, a first sun gear and the pawl control member of the shift mechanism of the hub assembly with other elements removed to provide greater clarity in accordance with the present invention.
Figure 16:
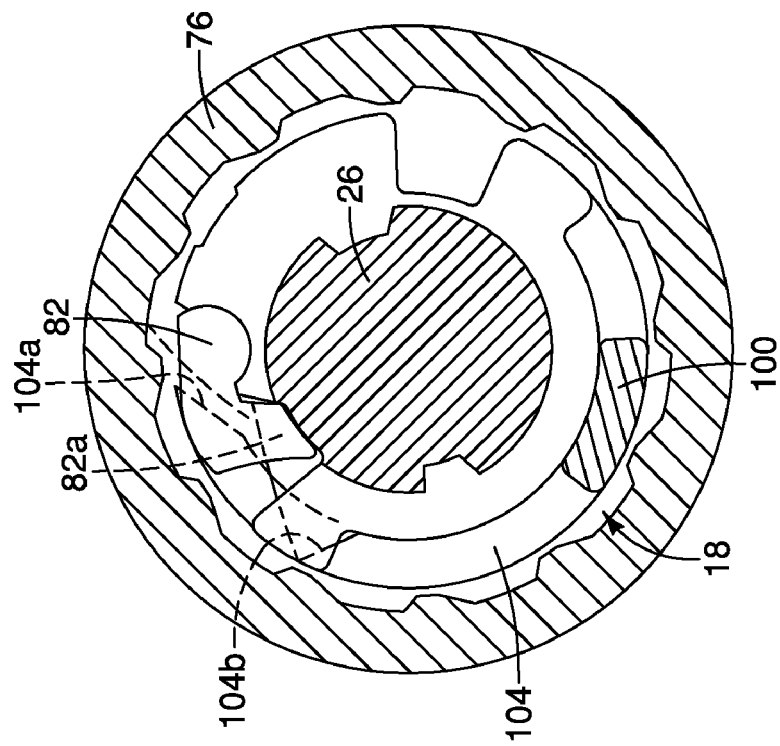
FIG. 16 is another cross-sectional view of the portion of the hub assembly showing the third control sleeve of the pawl control member positioned to prevent the pawl from engaging the inner set of gear teeth of a third sun gear in accordance with the present invention.

As best shown in FIG. 3, the transmission support portion 34 of the hub axle 26 is dimensioned to receive and retain various portions of the power transmission assembly 14. The transmission support portion 34 of the hub axle 26 basically includes lobes or protrusions with an overall diameter larger than the outer diameter of the shift control support portion 32. The transmission support portion 34 further includes a series of circumferentially extending recesses and axially extending grooves that intersect with one another. Specifically as shown in FIG. 3, the transmission support portion 34 includes the following circumferentially extending recesses: a spring retaining recess 40, a first pawl control arm receiving recess 42, a second pawl control arm receiving recess 44, spring receiving recesses 46 and 48 and a third pawl control arm receiving recess 50. Further, the transmission support portion 34 includes the following axially extending grooves: a first locking groove 60, a second locking groove 62, a pawl receiving groove 64 that includes a first, second and third portion 64a, 64b and 64c and a control arm receiving groove 68 that is best shown in FIG. 8. These grooves and recesses of the transmission support portion 34 receive elements the power transmission assembly 14, as described below.

As best shown in FIG. 2, the driver 28 is rotatably supported about the hub axle 26 in a conventional manner by conventional bearings $B_1$ and the hub shell 30 is rotatably supported to the hub axle 26 and the driver 28 in a conventional manner by conventional bearings $B_2$ and $B_3$. The driver 28 can be selectively coupled to the hub shell 30 by the power transmission assembly 14 such that torque applied to the driver 28 is transmitted to the hub shell 30 in any one of a plurality of selected power transmission paths described below.

The hub shell 30 includes first torque transmission gear teeth 30a (right side of FIG. 2) and second torque transmission gear teeth 30b (left side of FIG. 2, whose function is described in greater detail below.

As best shown in FIGS. 2 and 3, the power transmission assembly 14 is a multi-speed internal hub transmission. The power transmission assembly 14 basically includes (among other things) the pawl control member 18 (FIG. 3), the clutch ring 20 (FIG. 2), a ring shaped shift key member 70 (FIGS. 2 and 4), the sleeve guide 22 (FIG. 2-3), the driver 28 (FIG. 2), a first sun gear 72 (FIG. 2), a second sun gear 74, a third sun gear 76, a fourth sun gear 78, a second sun gear pawl 80, a third sun gear pawl 82, a fourth sun gear pawl 84, a planet gear carrier 86 (FIG. 2), a first set of planet gears 88 (FIG. 2), a second set of planet gears 90 (FIG. 2), a pawl 92 (FIG. 2), a first ring gear 94 (FIG. 2), a second ring gear 96 (FIG. 2), a pawl 98 (FIG. 2) and the shift mechanism 16. The power transmission mechanism 14 is operably disposed between the driver 28 and the hub shell 30 for communicating rotational power from the driver 28 to the hub shell 30 through a plurality of differing torque transmission paths, as described below.

A description of the pawl control member 18 is now provided with specific reference to FIGS. 3, 8 and 10-14. The pawl control member 18 is a shift control sleeve that basically includes a base sleeve 100, a first control sleeve 102, a second control sleeve 104 and a third control sleeve 106. The base sleeve 100 is an elongated straight portion that extends approximately the length of the transmission support portion 34 of the hub axle 26. The base sleeve 100 is an elongated flat bar-like portion includes a first end 108 and a second end 110.

As indicated in FIG. 3-5 and 10, with the hub assembly 12 fully assembled: the base sleeve 100 is disposed within the control arm receiving groove 68 of the transmission support portion 34 of the hub axle 26; the first control sleeve 102 is disposed within the first pawl control arm receiving recess 42; the second control sleeve 104 is disposed within the second pawl control arm receiving recess 44; and the third control sleeve 106 is disposed within the third pawl control arm receiving recess 50.

During the shifting process, the first control sleeve 102, the first pawl control arm receiving recess 42, the second control sleeve 104, the second pawl control arm receiving recess 44, the third control sleeve 106 and the third pawl control arm receiving recess 50 act as bearing surfaces. More specifically, the first control sleeve 102 is circumferentially slidable within the first pawl control arm receiving recess 42; the second control sleeve 104 is circumferentially slidable within the second pawl control arm receiving recess 44; and the third control sleeve 106 is circumferentially slidable within the third pawl control arm receiving recess 50. Further, as the pawl control member 18 is circumferentially displaced about the hub axle 26, the circumferential movement is limited mainly by the base sleeve 100 contacting the surfaces on either circumferential side 68a and 68b of the control arm receiving groove 68, as indicated in FIG. 8.

Figure 10:
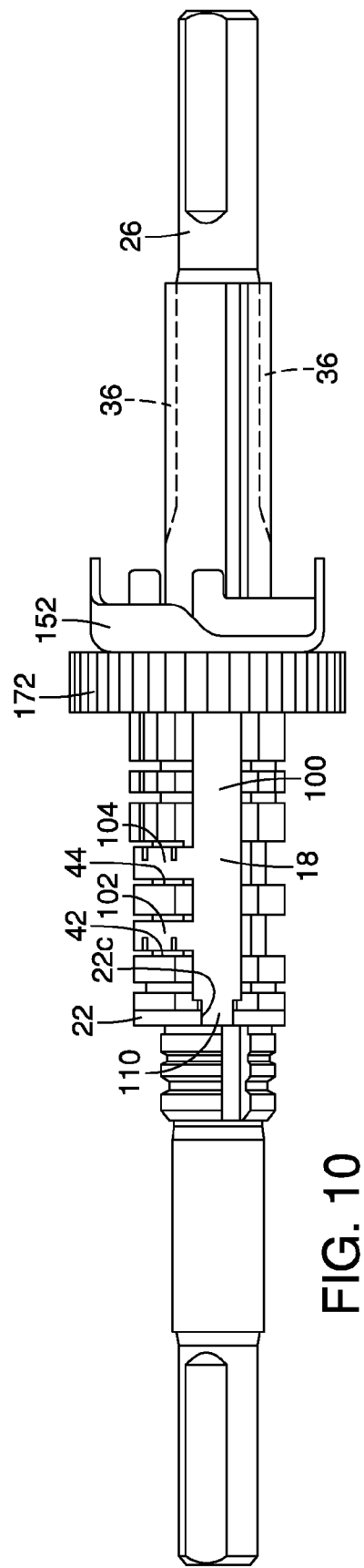
FIG. 10 is a side elevational view of the portion of the hub assembly showing the hub axle, the sleeve guide, the first sun gear, the shift key guide and the pawl control member with other elements removed to provide greater clarity in accordance with the present invention.

As best shown in FIGS. 11 and 12, the first control sleeve 102 of the pawl control member 18 includes pawl control recesses 102a and 102b. With the hub assembly 12 fully assembled, the first control sleeve 102 is disposed within the first pawl control arm receiving recess 42 of the hub axle 26, as shown in FIG. 10. The pawl control recesses 102a and 102b are dimensioned to interact with a projection 84a of the fourth sun gear pawl 84. For example, when the pawl control member 18 is moved to select a power transmission path, the projection 84a of the fourth sun gear pawl 84 can move into one or the other of the pawl control recesses 102a and 102b and the fourth sun gear pawl 84 moves radially outward. As a result, the fourth sun gear pawl 84 engages an inner surface of the fourth sun gear 78 such that the fourth sun gear 78 no longer rotates relative to the hub axle 26 in one direction. The operation of the first control sleeve 102 is similar to operation of the second and third control sleeves 104 and 106. The following description of the second control sleeve 104 and FIGS. 15-18 also applies to both the first control sleeve 102 and the third control sleeve 106.

Figure 15:
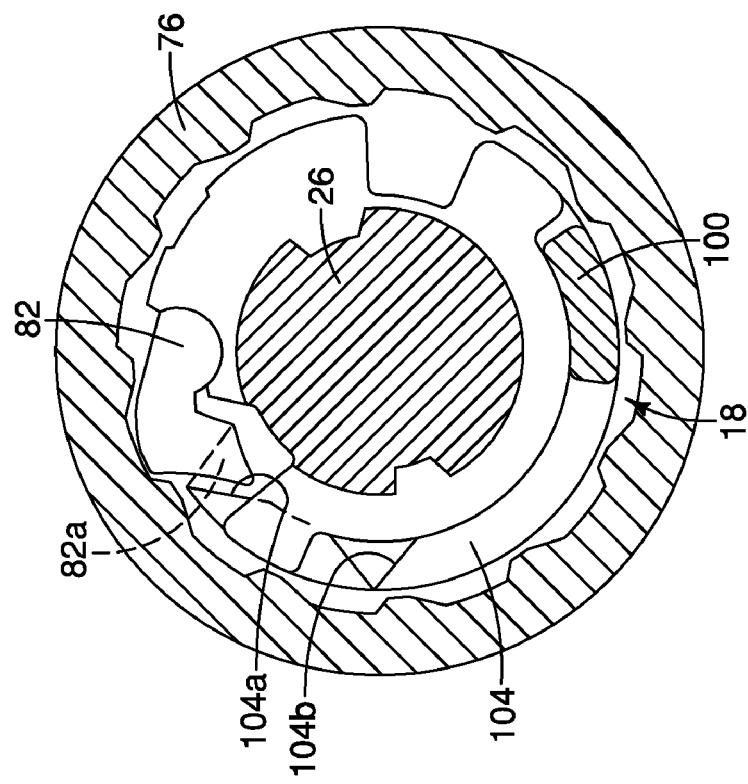
FIG. 15 is a cross-sectional view of a portion of the hub assembly showing the third control sleeve of the pawl control member positioned to allow a pawl to engage an inner set of gear teeth of a third sun gear disposed about the hub shaft such that the pawl acts as a one way clutch preventing the third sun gear from rotating in one direction in accordance with the present invention.
Figure 18:
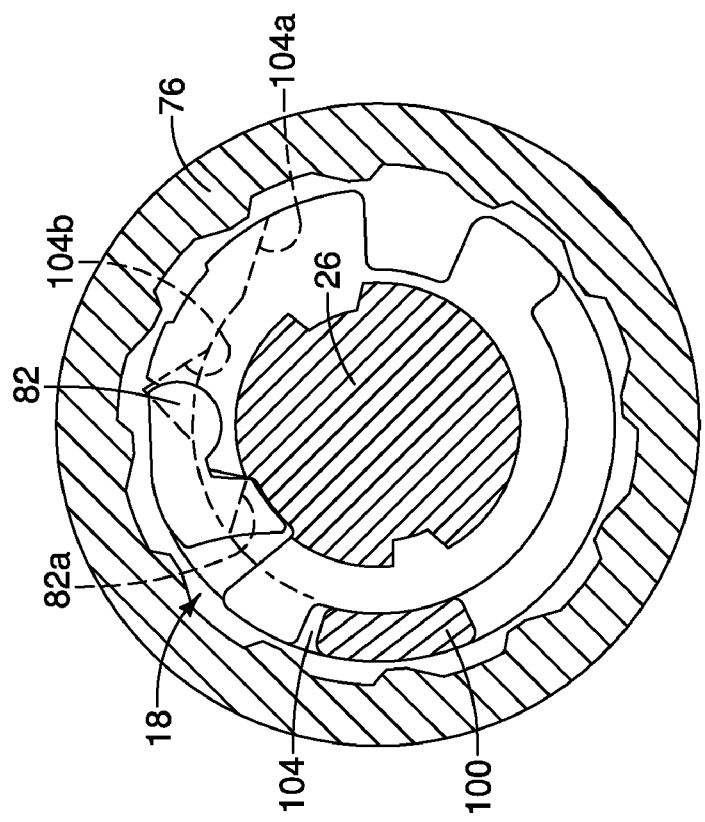
FIG. 18 is still another cross-sectional view of the portion of the hub assembly showing the third control sleeve of the pawl control member in another position that prevents the pawl from engaging the inner set of gear teeth of a third sun gear in accordance with the present invention.
Figure 17:
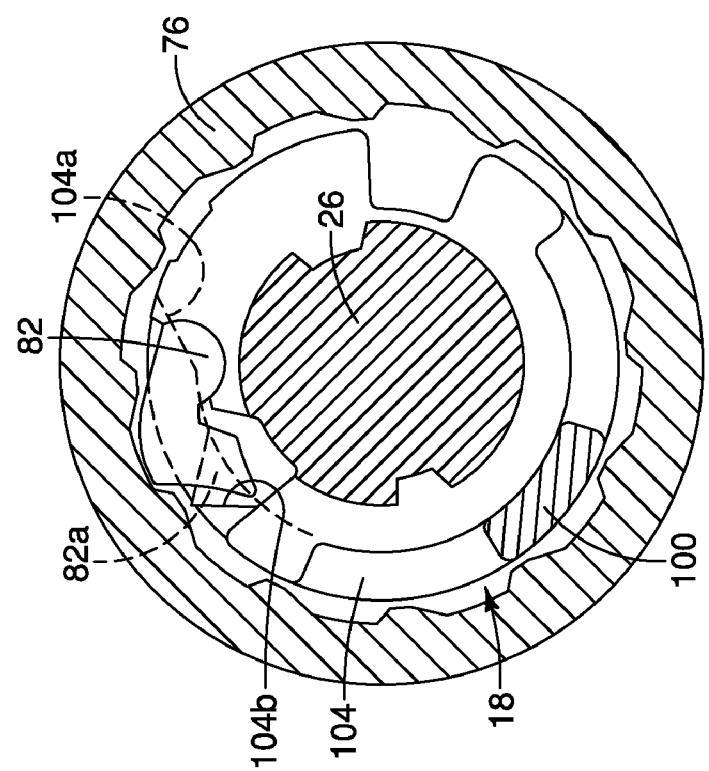
FIG. 17 is yet another cross-sectional view of the portion of the hub assembly showing the third control sleeve of the pawl control member positioned to allow the pawl to engage the inner set of gear teeth of the third sun gear such that the pawl acts as a one way clutch preventing the third sun gear from rotating in one direction in accordance with the present invention.

As best shown in FIGS. 11, 13 and 15-18, the second control sleeve 104 of the pawl control member 18 includes pawl control recesses 104a and 104b. With the hub assembly 12 fully assembled, the second control sleeve 104 is disposed within the second pawl control arm receiving recess 44 of the hub axle 26, as shown in FIG. 10. The pawl control recesses 104a and 104b are dimensioned to interact with a projection 82a of the third sun gear pawl 82. For example, when the pawl control member 18 is moved to select a power transmission path, the projection 82a of the third sun gear pawl 82 can move into one or the other of the pawl control recesses 104a and 104b and the third sun gear pawl 82 moves radially outward, as shown in FIGS. 15 and 17. As a result, the third sun gear pawl 82 engages an inner surface of the third sun gear 76 such that the third sun gear 76 is prevented from rotating relative to the hub axle 26 in one direction. Hence the third sun gear pawl 82 acts as a one-way clutch allowing the third sun gear 76 to rotate in only one direction. However, when the projection 82a contacts other portions of the second control sleeve 104, the third sun gear pawl 82 is urged inward and the third sun gear 76 can rotate freely in both directions about the hub axle 26.

As best shown in FIGS. 11 and 14, the third control sleeve 106 of the pawl control member 18 includes pawl control recesses 106a and 106b. With the hub assembly 12 fully assembled, the third control sleeve 106 is disposed within the third pawl control arm receiving recess 50 of the hub axle 26. The pawl control recesses 106a and 106b are dimensioned to interact with a projection 80a of the second sun gear pawl 80. For example, when the pawl control member 18 is moved to select a power transmission path, the projection 80a of the second sun gear pawl 80 can move into one or the other of the pawl control recesses 106a and 106b and the second sun gear pawl 80 moves radially outward. As a result, the second sun gear pawl 80 engages an inner surface of the second sun gear 74 such that the second sun gear 74 is prevented from rotating relative to the hub axle 26 in one direction.

The positioning of the pawl control member 18 determines which power transmission path or gear ratio is engaged within the hub assembly 12. In the embodiment of the invention described herein, there are eight power transmission paths (described below). It should be understood from the drawings and description herein that the present invention can be used with hub assemblies having any of a variety of power transmission paths and is not limited to use with a hub assembly having eight power transmission paths. For example, the present invention can be used in a hub assembly having just two power transmission paths or more, 10 or more power transmission paths.

A further description of the first end 108 and the second end 110 of the base sleeve 100 is provided below after description of related elements.

As shown in FIGS. 2, 7, 22 and 23, the clutch ring 20 is an annular member with a first set of gear teeth 120 on an outer periphery thereof and a second set of gear teeth 122 at an axial end thereof. An inner peripheral surface of the clutch ring 20 includes a retaining clip 124 and a radially inward extending portion 126. The shift key member 70 is axially confined between the retaining clip 124 and the radially inward extending portion 126, as best shown in FIGS. 22 and 23. The clutch ring 20 is disposed radially inward from the hub shell 30 and the driver 28 and radially outward from the shift mechanism 16. The clutch ring 20 can undergo limited movement in an axial direction relative to the hub axle 26 and is rotatable about the hub axle 26, as indicated in FIGS. 22 and 23.

As best shown in FIG. 3, the sleeve guide 22 has an annular disk shape with a central aperture 22a, a first recess 22b and a second recess 22c. The central aperture 22a is dimensioned to receive a portion of the transmission support portion 34 of the hub axle 26, as indicated in FIG. 8. Hence, the sleeve guide 22 is rotatably disposed about the hub axle 26. The second recess 22c of the sleeve guide 22 is shaped and dimensioned to the second end 110 of the pawl control member 18. More specifically, the second end 110 of the sleeve guide 22 is shaped to fit into the second recess 22c of the sleeve guide 22. As is described further below, when the second end 110 is inserted into the second recess 22c of the sleeve guide 22, the second end 108 is welded to the sleeve guide 22 to ensure a rigid fixed attachment. Hence, there is no play or relative movement between the sleeve guide 22 and the pawl control member 18.

With reference again to FIG. 2, a description of the driver 28 is now provided. The driver 28 is a generally annular member with several differing diameter portions that is rotatably supported about the hub axle 26 by the bearings $B_1$ in a conventional manner. The driver 28 further supports the bearings $B_3$ that support the hub shell 30.

As shown in FIGS. 2, 22 and 23, the driver 28 includes gear teeth 134 (FIGS. 22 and 23) on a radially inward surface thereof a chain sprocket support portion 136 (FIG. 2 only), a pawl engaging portion 138 on a radially outward portion and shift assist gear teeth 140 (FIGS. 2, 19, 20 and 21) on a radially inward portion. The gear teeth 134 are dimensioned to mesh with the first set of gear teeth 120 of the clutch ring 20 such that the clutch ring 20 always rotates with the driver 28 (FIGS. 22 and 23). However, the clutch ring 20 is configured to move in an axial direction along the length of the gear teeth 134, as described below. As best shown in FIG. 2, the chain sprocket support portion 136 of the driver 28 supports a chain sprocket S that is fixedly attached to the driver 28 for rotation therewith. The driver 28, the clutch ring 20 and the chain sprocket S rotate together as a single unit. The purpose of the shift assist gear teeth 140 is explained below.

The clutch ring 20 is movable from a first position shown in FIGS. 22 and 24-27 to a second position shown in FIGS. 23 and 28-31. In the first position shown in FIGS. 22 and 24-27, the clutch ring 20 is idle and rotates with the driver 28. Hence, with the clutch ring 20 in the first position, torque from the driver 28 is transmitted to the first ring gear 94 via the pawl 92 in a first group of first power transmission paths depicted in FIGS. 24-27, as described in greater detail below. In the second position shown in FIGS. 23 and 28-31, the second set of gear teeth 122 of the clutch ring 20 engage and mesh with gear teeth of the plane gear carrier 86 and torque from the driver 28 is transmitted from the driver 28 to the plane gear carrier 86 in a second group of power transmission path depicted in FIGS. 28-31, as described in greater detail below. The clutch ring 20 is moved between the first and second positions by the shift mechanism 16, as described below. As described in greater detail below, the shift key member 70 functions to couple the clutch ring 20 to portions of the shift mechanism 16 for movement of the clutch ring 20 between the first position (FIG. 24) and the second position (FIG. 25) of the clutch ring 20.

Figure 4:
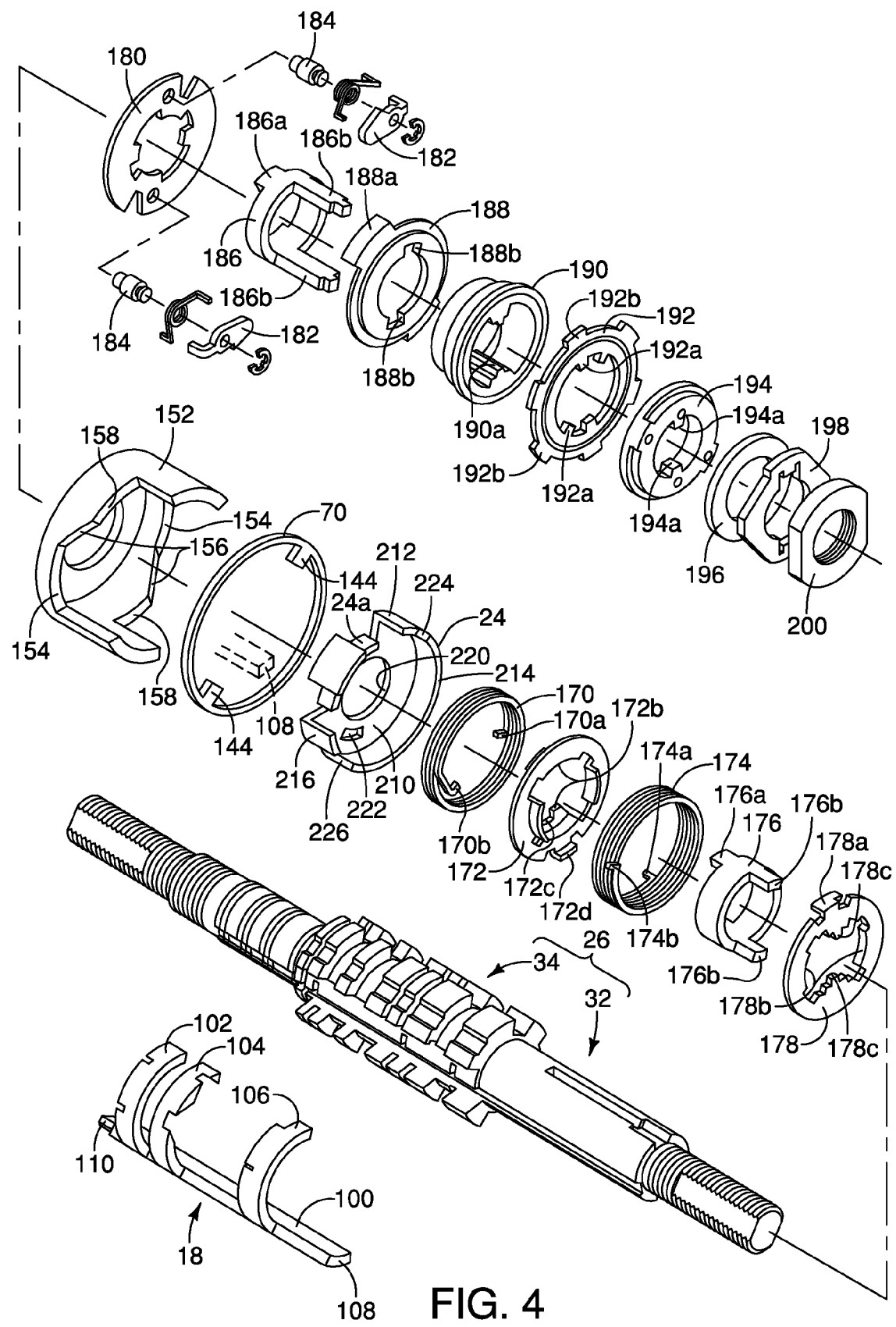
FIG. 4 is an exploded view of a portion of the hub assembly showing the hub axle and elements of the shift mechanism including the a pawl control member and a shifting key guide in accordance with the present invention.
Figure 5:
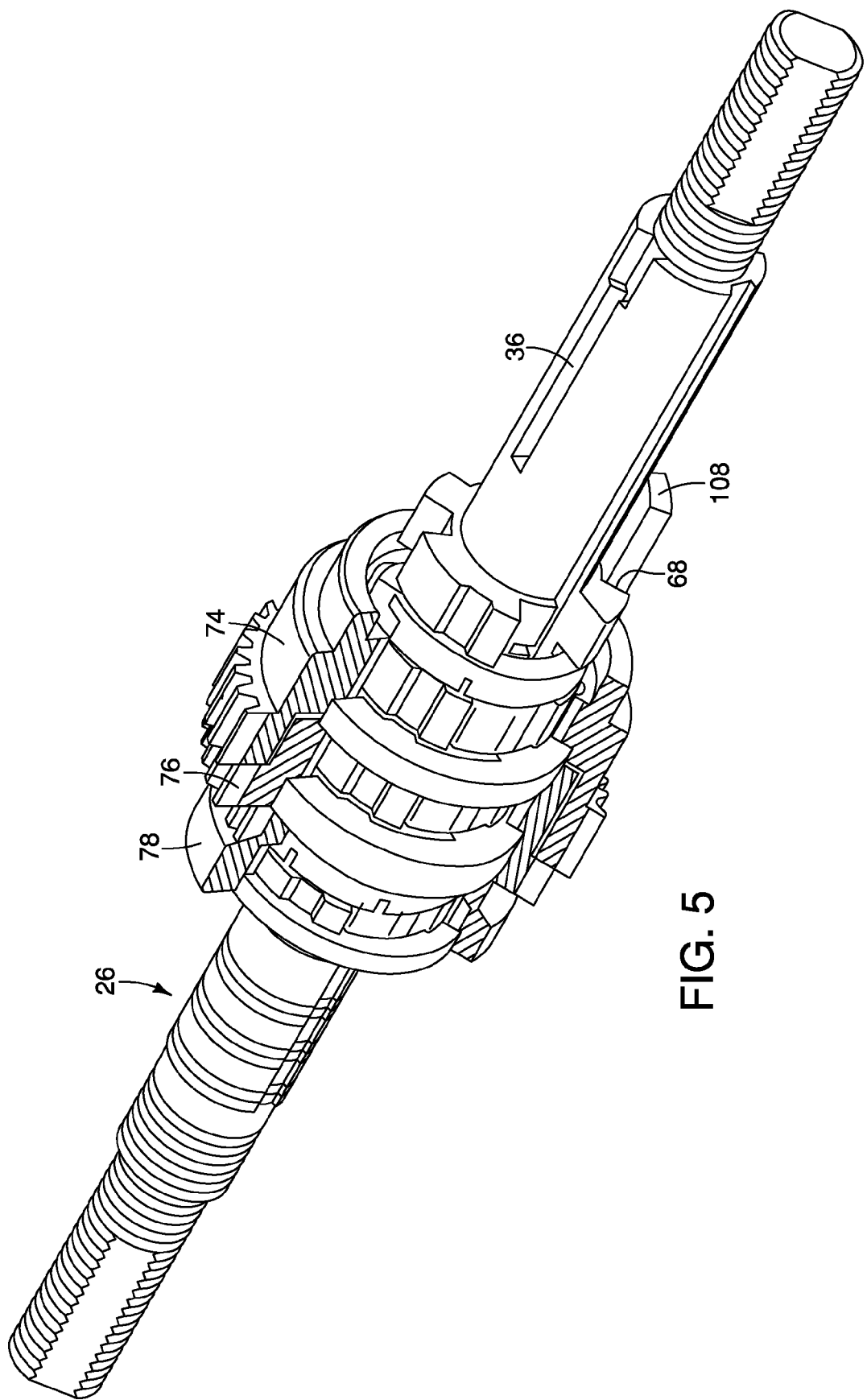
FIG. 5 is a perspective view of a portion of the hub assembly partially assembled showing the hub axle, sun gears and a portion of the pawl control member with other elements removed for clarity in accordance with the present invention.

A description of the shift key member 70 is now provided with specific reference to FIGS. 2 and 4. The shift key member 70 is an annular ring-shaped member and includes a pair of radially inwardly extending cam followers 144. The outer annular portion of the shift key member 70 is confined between the retaining clip 124 and the radially inward extending portion 126 of the clutch ring 20.

A description of the first sun gear 72 is now provided with specific reference to FIGS. 2, 3, 6 and 7. The first sun gear 72 is non-rotatably supported on the hub axle 26 in a conventional manner. The first sun gear 72 includes radially outwardly extending gear teeth that mesh with small diameter gear teeth on the first set of planet gears 88 in a conventional manner, as indicated in FIG. 2.

As shown in FIG. 2, a cam portion 152 is located adjacent to the first sun gear 72. The cam portion 152 can be formed as a part of the first sun gear 72 or can be a member separate from the first sun gear 72, as indicated in FIGS. 2 and 4. The cam portion 152 is non-rotatably installed on the transmission support portion 34 of the hub axle 26. As best shown in FIG. 4, the cam portion 152 includes a pair of first cam surfaces 154, second cam surfaces 156 and third cam surfaces 158. The cam portion 152 is configured to move the shift key member 70 and the clutch ring 20 between the first and second positions shown in FIGS. 24 and 25, as described in greater detail below. The shift key member 70 has an inner overall diameter (absent the pair of radially inwardly extending earn followers 144) that is slightly greater than an outer diameter of cam portion 152 of the first sun gear 72. However, the pair of radially inwardly extending cam followers 144 extend radially inward beyond an inner surface of the cam portion 152, as explained further below in the description of the shifting key guide 24.

A description of the second sun gear 74, the third sun gear 76 and the fourth sun gear 78 is now provided with specific reference to FIGS. 2, 3, 5, 6 and 7. The second sun gear 74, the third sun gear 76 and the fourth sun gear 78 are all selectively rotatable relative to the axle 26. The second sun gear 74, the third sun gear 76 and the fourth sun gear 78 each have respective conventional internal pawl ratchet teeth and external gear teeth.

As shown in FIG. 3, the second sun gear pawl 80 includes a control portion 80*a* and a spring 80*b*. The control portion 80*a* of the second sun gear pawl 80 is pivotally retained within the third portion 64*c* of the recess 64 of the hub axle 26 such that the second sun gear pawl 80 can selectively pivot radially outward and ratchet against the internal pawl ratchet teeth of the second sun gear 74. The spring 80*b* is installed in the spring receiving recess 48 and biases the second sun gear pawl 80 outward. The second sun gear pawl 80 remains in position relative to the hub axle 26 and selectively engages the internal ratchet teeth of the second sun gear 74 in response to positioning of the pawl control member 18. More specifically, when one of the pawl control recesses 106*a* or 106*b* of the third control sleeve 106 aligns with the control portion 80*a* of the second sun gear pawl 80, the second sun gear pawl 80 moves radially outward to contact the internal ratchet teeth of the second sun gear 74 thereby allowing rotation of the second sun gear 74 in one rotational direction only. In other words, the second sun gear pawl 80 functions as a one-way clutch. Otherwise, contact between the control portion 80*a* with the remaining portions of the third control sleeve 106 pulls the second sun gear pawl 80 radially inward and the second sun gear 74 freewheels about the hub axle 26 in a conventional manner.

Similarly, the third sun gear pawl 82 includes a control portion 82*a* and a spring 82*b*. The control portion 82*a* of the third sun gear pawl 82 is pivotally retained within the second portion 64*b* of the recess 64 of the hub axle 26 such that the third sun gear pawl 82 can selectively pivot radially outward and ratchet against the internal pawl ratchet teeth of the third sun gear 76. The spring 82*b* is installed in the spring receiving recess 46 and biases the third sun gear pawl 82 outward. The third sun gear pawl 82 remains in position relative to the hub axle 26 and selectively engages the internal ratchet teeth of the third sun gear 76 in response to positioning of the pawl control member 18. More specifically, when one of the pawl control recesses 104*a* or 104*b* of the second control sleeve 104 aligns with the control portion 82*a* of the third sun gear pawl 82, the third sun gear pawl 82 moves radially outward to contact the internal ratchet teeth of the third sun gear 76 thereby allowing rotation of the third sun gear 76 in one rotational direction only. In other words, the third sun gear pawl 82 functions as a one-way clutch. Otherwise, contact between the control portion 82*a* with the remaining portions of the second control sleeve 104 pulls the third sun gear pawl 82 radially inward and the third sun gear 76 freewheels about the hub axle 26 in a conventional manner.

Similarly, the fourth sun gear pawl 84 includes a control portion 84*a* and a spring 84*b*. The control portion 84*a* of the fourth sun gear pawl 84 is pivotally retained within the first portion 64*a* of the recess 64 of the hub axle 26 such that the fourth sun gear pawl 84 can selectively pivot radially outward and ratchet against the internal pawl ratchet teeth of the fourth sun gear 78. The spring 84b is installed in the spring receiving recess 40 and biases the fourth sun gear pawl 84 outward. The fourth sun gear pawl 84 remains in position relative to the hub axle 26 and selectively engages the internal ratchet teeth of the third sun gear 76 in response to positioning of the pawl control member 18. More specifically, when one of the pawl control recesses 102a or 102b of the first control sleeve 102 aligns with the control portion 84a of the fourth sun gear pawl 84, the fourth sun gear pawl 84 moves radially outward to contact the internal ratchet teeth of the fourth sun gear 78 thereby allowing rotation of the fourth sun gear 78 in one rotational direction only. In other words, the fourth sun gear pawl 84 functions as a one-way clutch. Otherwise, contact between the control portion 84a with the remaining portions of the first control sleeve 102 pulls the fourth sun gear pawl 84 radially inward and the fourth sun gear 78 freewheels about the hub axle 26 in a conventional manner.

As shown in FIG. 2, the planet gear carrier 86 is a conventional cage-like member with shafts that support the first set of planet gears 88 and the second set of planet gears 90. More specifically, the planet gear carrier 86 includes an annular shaped portion rotatably supported about the hub axle 26. The planet gear carrier 86 is configured to support and retain the first and second sets of planet gears 88 and 90 in a conventional manner. The planet gear carrier 86 includes a smaller diameter portion 160 and a larger diameter portion 162. As shown at the left hand side of FIG. 2, the smaller diameter portion 160 is located adjacent to the bearing assembly B₂. The larger diameter portion 162 of the planet gear carrier 86 includes a plurality of shafts 164 that support the sets of first and second planet gears 88 and 90 such that the first and second planet gears 88 and 90 freely rotate about the shafts 164 of the planet gear carrier 86. The larger diameter portion 162 also includes gear teeth 86a adjacent to the clutch ring 20 configured to engage the second set of gear teeth 122 of the clutch ring 20 with the clutch ring 20 in the second position shown in FIGS. 23 and 28-31.

The planet gear carrier 86 preferably supports three of the first set of planet gears 88 (only one is shown in FIG. 2) and three of the second set of planet gears 90 (only one is shown in FIG. 2). Each of the first set of planet gears 88 includes a small diameter set of gear teeth 88a and a large diameter set of gear teeth 88b. The small diameter set of gear teeth 88a mesh with the external gear teeth 72a of the first sun gear 72. The large diameter set of gear teeth 88b of the first sun gear 72 mesh with internal gear teeth of the first ring gear 94.

Each of the second set of planet gears 90 includes a small diameter set of gear teeth 90a, an intermediate diameter set of gear teeth 90b and a set of large diameter set of gear teeth 90c. The small diameter set of gear teeth 90a mesh with the external gear teeth of the second sun gear 74 and internal gear teeth of the second ring gear 96. The intermediate diameter set of gear teeth 90b mesh with external gear teeth of the third sun gear 76. The large diameter set of gear teeth 90c mesh with external gear teeth of the fourth sun gear 78.

The pawl 92 is disposed between the pawl engaging portion 138 of the driver 28 and a portion of the first ring gear 94. The pawl 92 acts as a one way clutch for the transmission of torque from the driver 28 to the first ring gear 94.

As shown in FIG. 2, the first ring gear 94 is an annular member that encircles the first planet gears 88, a portion of the large diameter portion 162 of the planet gear carrier 86 and the pawl 92. The first ring gear 94 is rotatable relative to the axle 26, the hub shell 30 and the planet gear carrier 86. The first ring gear 94 includes a plurality of internal gear teeth 94a and internal gear teeth 94b. The internal gear teeth 94a mesh with the large diameter gear teeth 88b of the first planet gears 88. The internal gear teeth 94b are configured for engagement with the pawl 92. The pawl 92 acts as a one way clutch that allows the first ring gear 94 to rotate in only one direction relative to the driver 28.

As shown in FIG. 2, the second ring gear 96 is operably coupled to the hub shell 30 via a one-way clutch in the form of a roller clutch 166 having a plurality of conventional rollers and cam surfaces.

As shown in FIG. 2, the pawl 98 is retained in a portion of the small diameter portion 100 of the planet gear carrier 86 in a conventional manner. The pawl 98 acts as a one way clutch for the transmission of torque from the planet gear carrier 86 to the hub shell 30.

The general operation and function of the second, third and fourth sun gears 80, 82 and 84, the planet gear carrier 86 and the first and second sets of planet gears 88 can also be found in, for example, U.S. Pat. No. 6,607,465 to Shoge (assigned to Shimano Inc.) and/or EP Patent Published Application No. 1,323,627.

With initial reference to FIG. 4, a description of the shift mechanism 16 is now provided. The shift mechanism 16 basically includes the following elements: the pawl control member 18, the cam portion 152, the shift key member 70, the shifting key guide 24, a first biasing spring 170, a spring washer 172, a second biasing spring 174, a first shift sleeve 176, a non-rotatable spring washer 178, a pawl support 180, a pair of pawls 182, a pair of pawl shafts 184, a second shift sleeve 186, a pawl control washer 188, a bearing cone 190, an actuator plate 192, a spacer 194, a washer 196, a non-rotatable lock washer 198 and a lock nut 200.

It should be appreciated from the following description, that the relative dimensions of the elements depicted in FIG. 4 are not necessarily to scale. For instance, the inner and outer diameters of the various elements may not be exactly to scale with the adjacent element. Rather, the relative dimensional relationships between the various elements of the shift mechanism 16 are best indicated in FIGS. 2, 22 and 23, as well as by the operating relationships between the various elements as described below.

Figure 6:
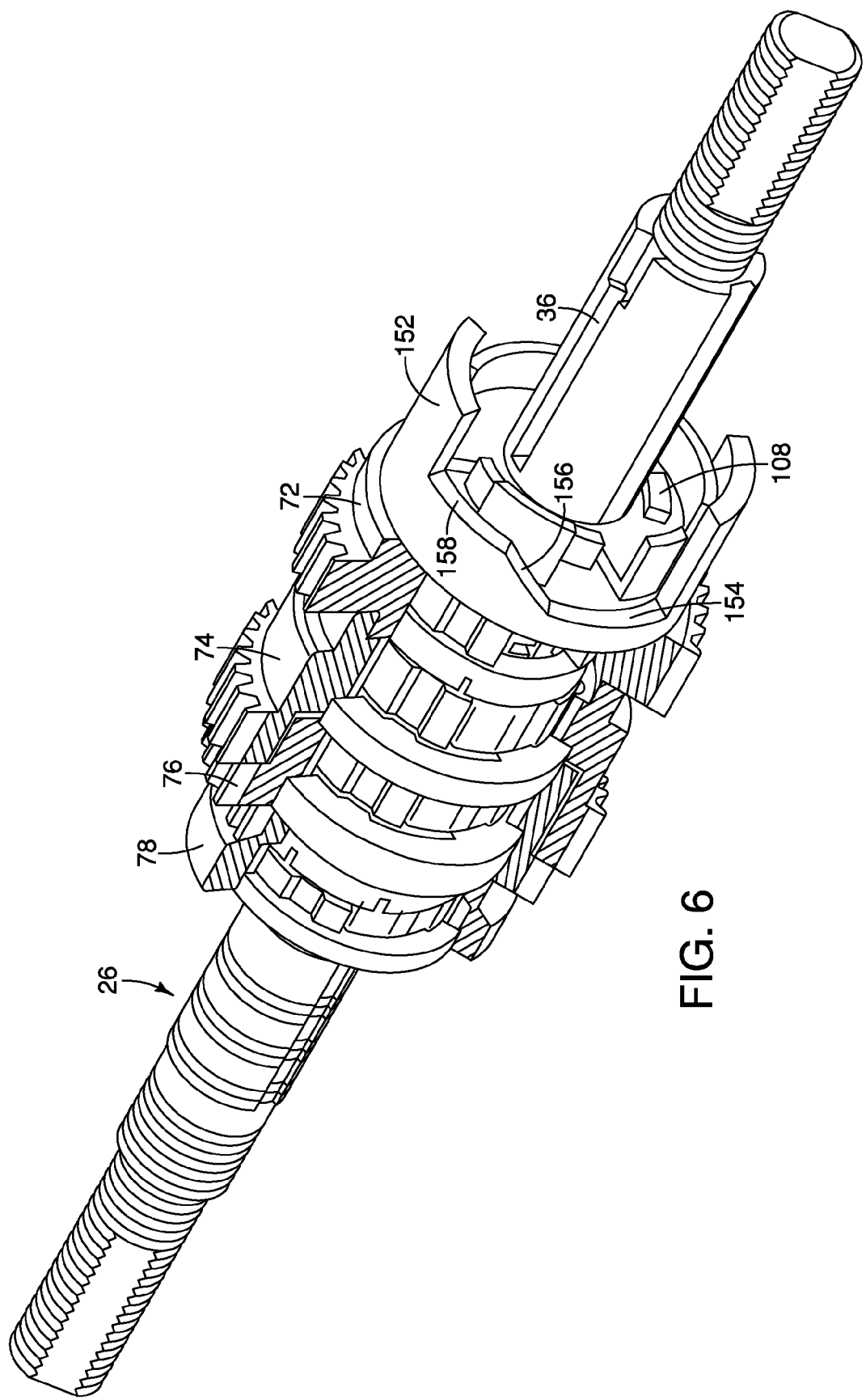
FIG. 6 is another perspective of the portion of the hub assembly similar to FIG. 5 with the portion of the hub assembly partially assembled showing the hub axle, the sun gears, a shift key guide and the portion of the pawl control member extending through an opening of the shift key guide with other elements removed for clarity in accordance with the present invention.
Figure 9:
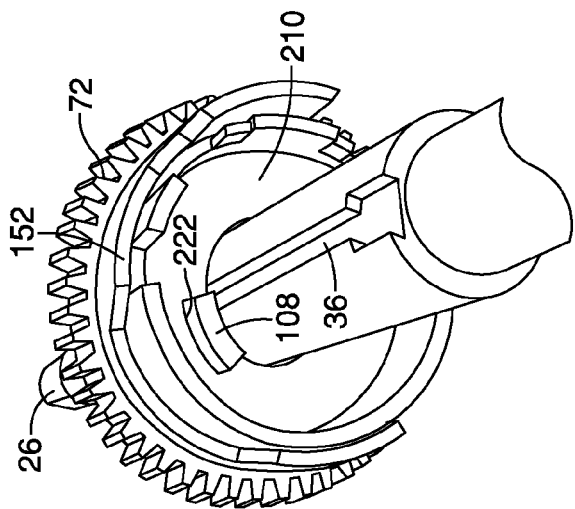
FIG. 9 is another perspective view of the portion of the hub assembly from a reverse angle, showing the hub axle, the first sun gear, the shift key guide and the portion of the pawl control member extending through the aperture of the shift key guide with other elements removed to provide greater clarity in accordance with the present invention.

With specific reference to FIGS. 4, 6 and 9, a description is now provided for the shifting key guide 24. The shifting key guide 24 is rotatably disposed about the hub axle 26. The shifting key guide 24 has an overall cup-like shape with a central disk portion 210 and surrounding pairs of arcuate wall portions 212, 214 and 216. The central disk portion 210 includes a central bore 220 (a central hub axle receiving aperture) and an opening 222. The central bore 220 is dimensioned to fit around a portion of the hub axle 26 such that the shifting key guide 24 is rotatable about the hub axle 26. Recesses 224 and 226 are defined between respective pairs of the arcuate wall portion 212 and 214, and arcuate wall portion 214 and 216.

Figure 7:
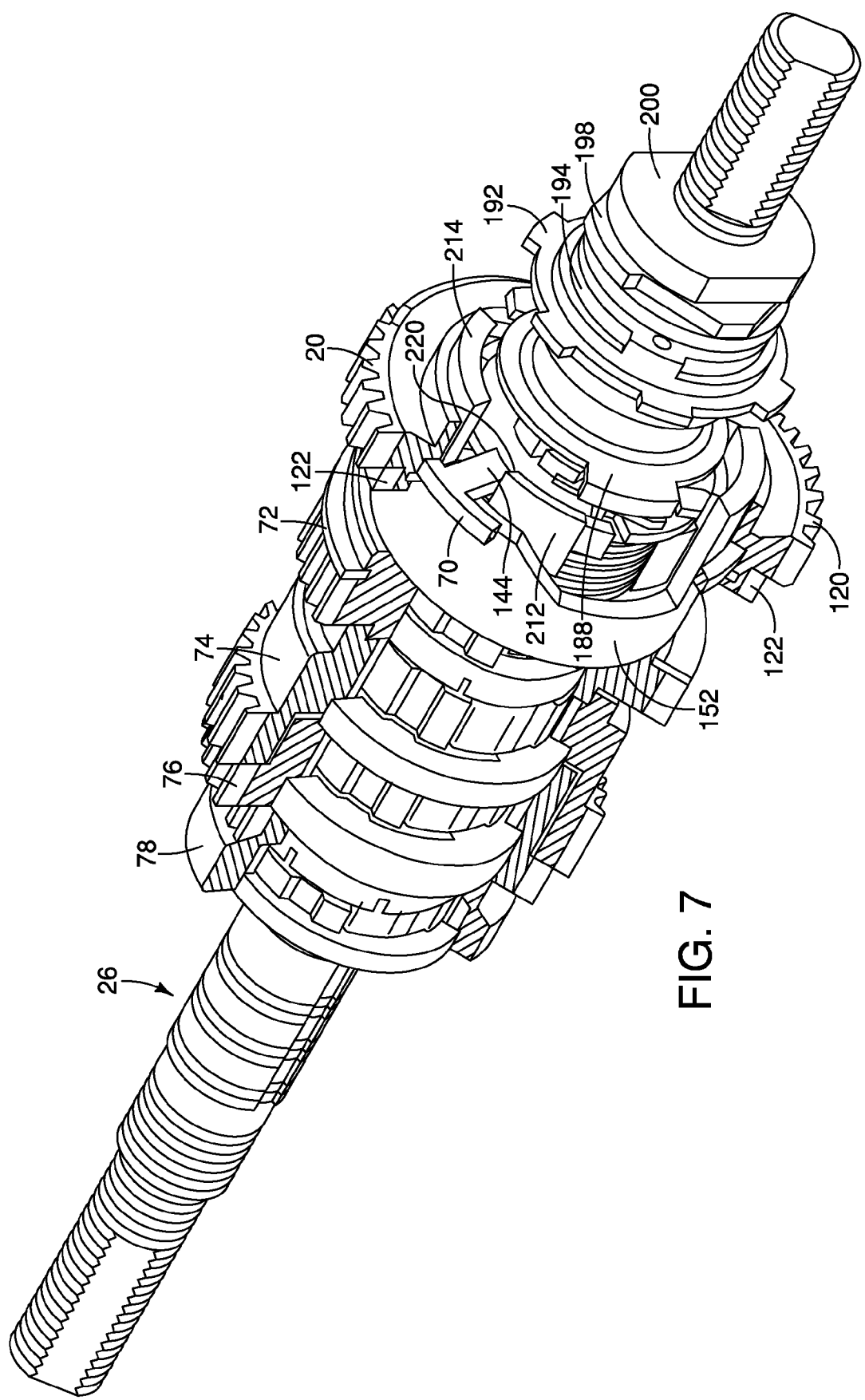
FIG. 7 is a perspective view of the portion of the hub assembly similar to FIGS. 5 and 6 with the portion of the hub assembly partially assembled showing the hub axle, the sun gears and elements of the shift mechanism of the hub assembly in accordance with the present invention.

As shown in FIG. 7, the inwardly extending cam followers 144 of the shift key member 70 extend into the recesses 224 and 226 (only recess 224 is visible in FIG. 7) such that the shift key member 70 rotates with the shifting key guide 24. However, the shift key member 70 can undergo axial movement with respect to the shifting key guide 24. The first sun gear 72 and the cam portion 152 of the first sun gear 72 cannot rotate relative to the hub axle 26. Therefore, when the shifting key guide 24 is rotated relative to the hub axle 26 and the cam portion 152, the cam followers 144 are moved in an axial direction due to contact with the cam surface 156 of the cam portion 152. More specifically, in a first rotational position, the cam followers 144 contact the cam surfaces 154 of the cam portion 152. As the shifting key guide 24 is rotated, the cam followers 144 contact the cam surface 156 and are then moved to the cam surface 158.

Since the shift key member 70 is confined within the clutch ring 20, the clutch ring 20 moves in an axial direction with the shift key member 70. For example, with the cam followers 144 of the shift key member 70 contacting the cam surface 154, the clutch ring 20 is in the position depicted in FIG. 22. As the shift key member 70 rotates with rotation of the shifting key guide 24, the cam followers 144 of shift key member 70 slide along the cam surfaces 156 until the cam followers 144 of the shift key member 70 contact the cam surface 158 (FIG. 23). Hence, the clutch ring 20 is moved to the position depicted in FIG. 23. As indicated in FIGS. 22 and 23, a biasing spring 225 urges the clutch ring 20 toward the position depicted in FIG. 23.

As indicated in FIGS. 6 and 9, the opening 222 of the central disk portion 210 of the shifting key guide 24 is dimensioned to receive the first end 108 of the pawl control member 18. Further, the first end 108 is welded to the shifting key guide 24 at the opening 222. As mentioned above, the second end 110 is welded to the sleeve guide 22. Hence, sleeve guide 22, the shifting key guide 24 and the pawl control member 18 are rigidly attached to one another. Further, when the shifting key guide 24 is rotated or undergoes circumferential displacement about the hub axle 26, the pawl control member 18 and sleeve guide 22 move about the hub axle 26 with the shifting key guide 24. In other words, the sleeve guide 22, the shifting key guide 24 and the pawl control member 18 rotate relative to the hub axle 26 as a single rigid unit.

With reference to FIG. 4, a description of the first biasing spring 170 is now provided. The first biasing spring 170 is basically a coil spring. The first biasing spring 170 has a first end 170a and a second end 170b. The minimum interior diameter of the arcuate wall portions 212, 214 and 216 of the shifting key guide 24 is larger than the first biasing spring 170, the spring washer 172 and the second biasing spring 174. Therefore, the first biasing spring 170, the spring washer 172 and the second biasing spring 174 are basically disposed within the shifting key guide 24. Further, the first end 170a of the first biasing spring 170 connects to a projection 24a of the shifting key guide 24 such that the first biasing spring 170 biases the shifting key guide 24 for rotational movement in the direction of lower speed power transmission paths. The second end 170b of the first biasing spring 170 connects to a projection 172a of the spring washer 172.

With reference to FIG. 4, a description of the spring washer 172 is now provided. The spring washer 172 is a disk shaped member that includes the above mentioned projection 172a, a pair of projections 172b, a central opening 172b, a pair of recesses 172c (only one recess 172c is visible in FIG. 4) and an outer axially extending projection 172d. The recesses 172c are open to the central opening 172b.

The second biasing spring 174 is a basically a coil spring having a first end 174a and a second end 174b. The first end 174a is connected to the outer axially extending projection 172d of the spring washer 172. The second end 174b of the second biasing spring 174 is connected to an outer axially extending projection 178a of the non-rotatable spring washer 178. Hence, the second biasing spring 174 biases the spring washer 172 for rotational movement in the direction of lower speed power transmission paths.

The first shift sleeve 176 is an annular ring shaped member that includes first axially extending projections 176a and second axially extending projections 176b. The outer diameter of the first shift sleeve 176 is smaller than the inner diameter of the first biasing spring 170 and the second biasing second biasing spring 174. However, the first axially extending projection 176a are dimensioned to fit snuggly into the pair of recesses 172c (only one recess 172c is visible in FIG. 4) of the spring washer 172. Hence, the spring washer 172 and the first shift sleeve 176 rotate together as a single unit.

The non-rotatable spring washer 178 has an annular disk shape that includes the above mentioned outer axially extending projection 178a, a central opening with a pair of arcuate circumferentially extending recesses or gaps 178b defined between a pair of inwardly extending projections 178c. With the non-rotatable spring washer 178 installed on the hub axle 26, the pair of inwardly extending projections 178c extend into the axially extending grooves 36. Hence, the non-rotatable spring washer 178 cannot rotate relative to the hub axle 26.

The second axially extending projections 176b of the first shift sleeve 176 are dimensioned such that the second axially extending projections 176b extend into the gaps 178b. The second axially extending projections 176b and the gaps 178b are further dimensioned such that the first shift sleeve 176 can undergo limited rotational displacement restricted by contact between the second axially extending projections 176b and the pair of inwardly extending projections 178c.

The pawl support 180 is a disk shaped element with a central aperture that that includes several recesses. The projections 176b of first shift sleeve 176 extend into the recesses such that the first shift sleeve 176 and the pawl support 180 rotate together as a single unit. Since the first shift sleeve 176 is also fixed to rotate with the spring washer 172, the spring washer 172, first shift sleeve 176 and the pawl support 180 all rotate together as a single unit. The pawl support 180 also includes a pair of apertures that rigidly support the pawl shafts 184. The pawls 182 are pivotally supported on the pawl shafts and biased by springs such that the pawls 182 are urged into engagement with the driver 28. Operation of the pawls 182 is described below.

Figure 21:
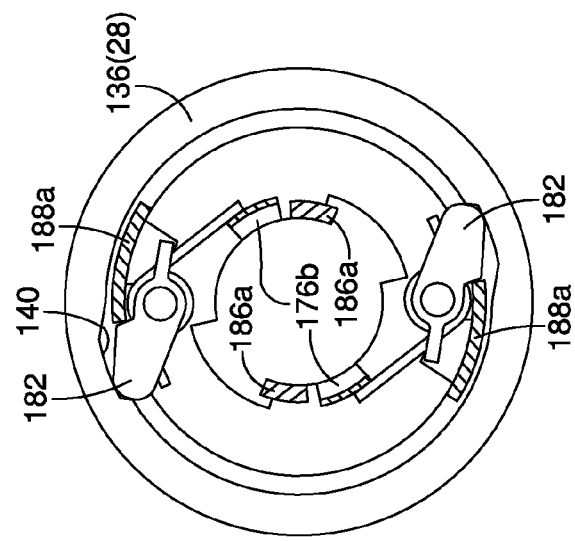
FIG. 21 is still another cross sectional view of the shift assist mechanism of the shift mechanism of the hub assembly showing the pair of shift assist pawls being moved from the engaged position back to the retracted position shown in FIG. 19 in accordance with the present invention.
Figure 20:
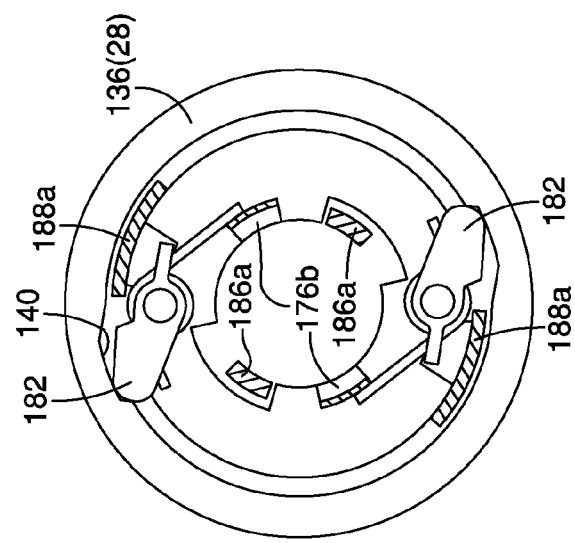
FIG. 20 is another cross sectional view of the shift assist mechanism of the shift mechanism of the hub assembly showing the pair of shift assist pawls in an engaged position contacting a portion of the driver urging the shift mechanism to rotate in accordance with the present invention.
Figure 19:
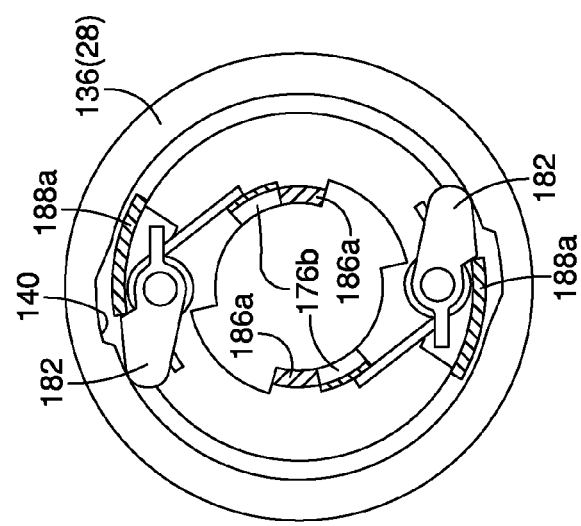
FIG. 19 is a cross sectional view of a shift assist mechanism of the shift mechanism of the hub assembly showing a pair of shift assist pawls in a retracted position urged radially inward by a pair of projection of a pawl control washer in accordance with the present invention.
Figure 28:
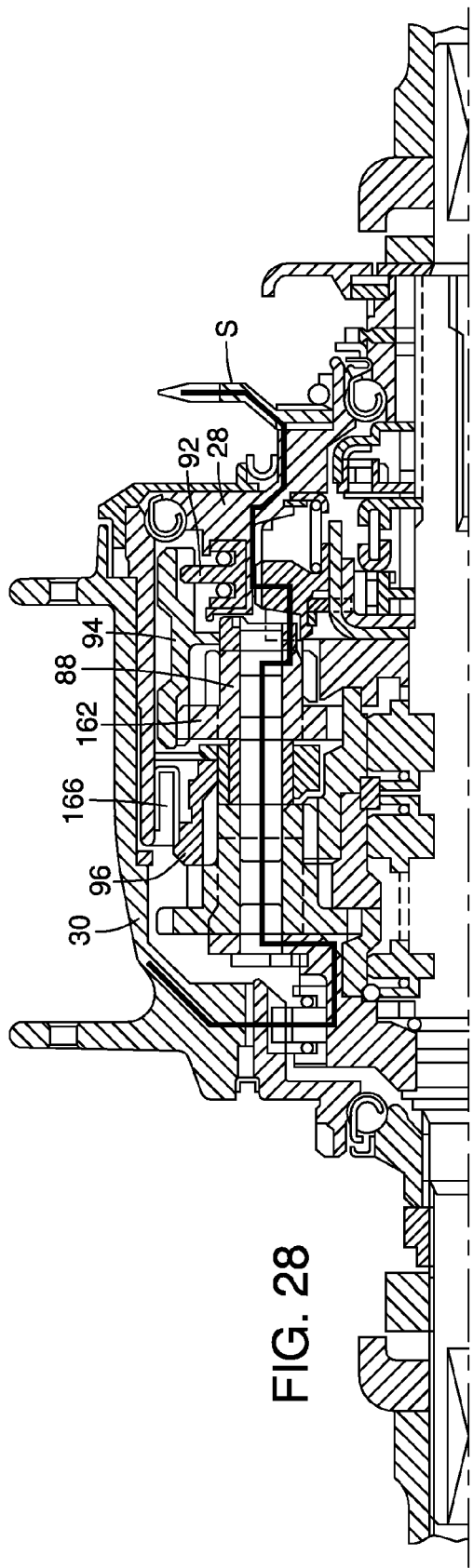
FIG. 28 is a cross-sectional view of a portion of the hub assembly similar to FIGS. 2 and 24-27 showing a fifth power transmission path superimposed over those element of the power transmission assembly that define the fifth power transmission in accordance with the first embodiment of the present invention.
Figure 29:
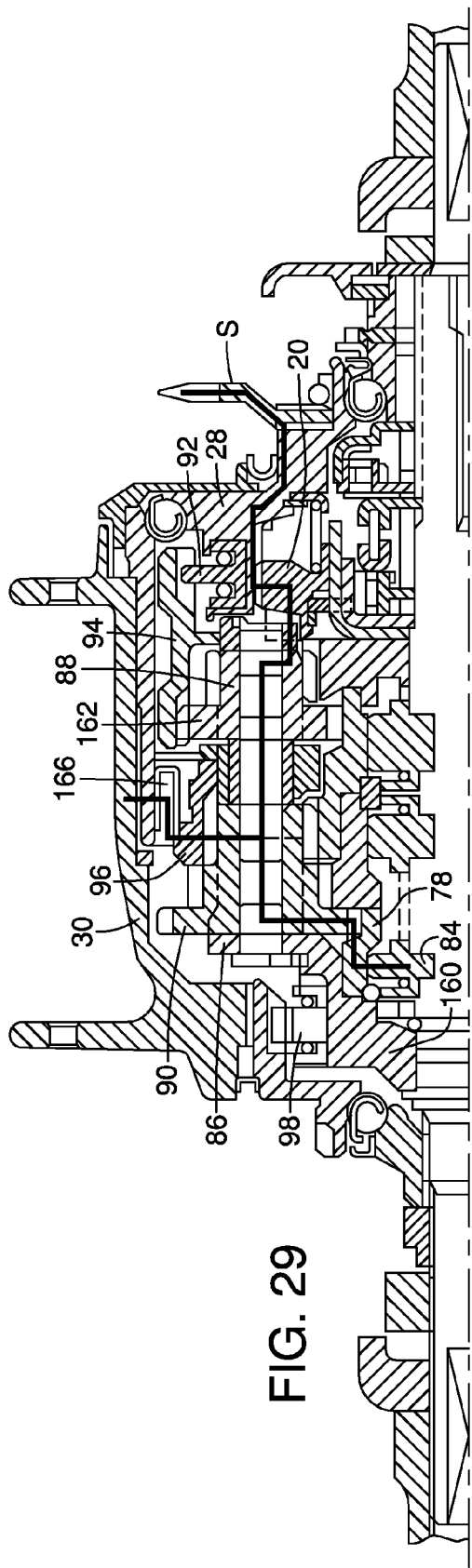
FIG. 29 is a cross-sectional view of a portion of the hub assembly similar to FIGS. 2 and 24-28 showing a sixth power transmission path superimposed over those element of the power transmission assembly that define the sixth power transmission in accordance with the first embodiment of the present invention.

The second shift sleeve 186 is a cylindrically shaped element similar to the first shift sleeve 176, and includes a pair of first projections 186a and a pair of second projections 186b. The first projections 186a have a diameter that is the same as the diameter of the projections 176b and are positioned to contact the projections 176a, as shown in FIGS. 19, 20 and 21, as described below. The second projections 186b are sufficiently long so that they extend through the pawl control washer 188 and the bearing cone 190.

Again referring to FIG. 4, the pawl control washer 188 includes outer axially extending projections 188a and a central aperture with a pair of recesses 188b. The second projections 186b of the second shift sleeve 186 are dimensioned to fit snuggly through the recesses 188b such that the second shift sleeve 186 and the pawl control washer 188 rotate together as a single unit. The projections 188a are dimensioned to interfere with the movement of the pawls 182 as shown in FIGS. 19-21, as described below.

The bearing cone 190 is dimensioned to support the bearings $B_1$, as indicated in FIG. 2. The bearing cone 190 includes inner projections 190a that are dimensioned to extend into the grooves 36 of the hub axle 26. Hence, the bearing cone 190 cannot rotate relative to the hub axle 26. The second projections 186b of the second shift sleeve 186 are free to rotate within the bearing cone 190 with interference from the inner projection 190a. Consequently, the second shift sleeve 186 can undergo limited rotational displacement with respect to the bearing cone 190.

The actuator plate 192 is a disk shaped member that includes inner protrusions 192a and outer protrusions 192b. The outer protrusions are dimensioned to mesh or engage portions of a coupling plate that is further operably connected to a conventional shifter lever (not shown) on the handlebars (not shown) of the bicycle 10. Movement of the conventional shifter lever causes movement of a conventional cable that in turn causes rotation of the actuator plate 192, thus allowing a cyclist to select the torque or power transmission path (speed) of the bicycle 10. The inner protrusions 192a are paired together such that each pair of inner protrusions 192a defines a gap therebetween. The gaps between the inner protrusions 192a are dimensioned to snuggly receive the second projections 186b of the second shift sleeve 186. Consequently, the shift sleeve 186, the pawl control washer 188 and the actuator plate 192 all rotate together as a single unit.

The spacer 194, the washer 196, the non-rotatable lock washer 198 and the lock nut 200 are all conventional assembly elements.

A description of the operation of the shift mechanism 16 and the power transmission assembly 14 is now provided.

During operation of the shift mechanism 16, when a cyclist selects a desired speed, the actuator plate 192 is rotated. As mentioned above, the actuator plate 192, the pawl control washer 188 and the second shift sleeve 186 all rotate together as a unit. During upshifting (from a slow speed to a faster speed), the first projections 186a of the second shift sleeve 186 contact the second projections 176b of the first shift sleeve 186, as indicated in FIG. 19. Consequently, the pawls 182 remain in a retracted position as shown in FIG. 19. Further, movement in an upshifting direction causes the first shift sleeve 186 to rotate the spring washer 172. Movement of the spring washer 172 puts tension on the first biasing spring 170, which then puts tension on the shifting key guide 24. If the force is sufficient, the shifting key guide 24 rotates accordingly and the pawl control member 18 also rotates causing appropriate positioning of the clutch ring 20 and activation of the appropriate sun gear pawl.

When a cyclist decides to downshift (go from a faster speed to a slower speed), the actuator plate 192 is rotated in a downshifting direction. The actuator plate 192, the pawl control washer 188 and the second shift sleeve 186 all rotate together as a unit. During downshifting, the first projections 186a of the second shift sleeve 186 can move away from the second projections 176b of the first shift sleeve 186, as indicated in FIG. 20. If there is sufficient tension on the pawl control member 18 due to hard pedaling (torque applied to elements of the power transmission assembly 14) it is possible downshifting may not occur at first. If the pawl control member 18 fails to move at first, then the shifting key guide 24 remains stationary. As a result, the biasing force of the first biasing spring 170 and/or the second biasing spring 174 urges the spring washer 172, the first shift sleeve 176 and the pawl support 180 to move in the downshifting direction. However, if there is insufficient biasing force in first biasing spring 170 and/or the second biasing spring 174 to move the first shift sleeve 176 and the pawl support 180 in the downshifting direction, then a shift assist mechanism is activated. The shift assist mechanism comprises the pawl support 180, the pawls 182 and the gear teeth 140 of the driver 28

When downshifting, the pawl control washer 188 rotates in the downshifting direction, but the pawl support 180 connected to the first shift sleeve 176 might not move, as indicated in FIG. 20. When this happens, the pawl control washer 188 moves away from the pawls 182 and the pawls 182 engage the gear teeth 140 of the driver 28. Since the bicycle 10 is likely moving, rotation of the driver 28 causes the pawls 182 to rotate the pawl support 180, the first shift sleeve 176 and the spring washer 172. The additional force on the pawl support 180, the first shift sleeve 176 and the spring washer 172 causes the shifting key guide 24 and the pawl control member 18 to move in the downshifting direction. Thereafter, the position of the projections 188a of the pawl control washer 188 are moved from the orientation depicted FIG. 21 back to the orientation depicted in FIG. 19. Hence the pawls 182 are again retracted.

In the depicted embodiment, there are eight different power transmission paths or speeds (speeds 1-8). The difference power transmission paths are selected by movement of the pawl control member 18 and the shifting key guide 24 (which are welded together). Movement of the pawl control member 18 causes selective engagement and disengagement of one of the second, third and fourth sun gear pawls 80, 82 and 84. Movement of the shifting key guide 24 causes movement of the shift key member 70 which in turn causes engagement and disengagement of the clutch ring 20. The power transmission paths (speeds 1-8) are now described with respect to FIGS. 24-31 and Tables 1 and 2 below.

TABLE 1

| Speed | Clutch ring 20 | Sun Gear 74 | Sun Gear 76 | Sun Gear 78 | Gear Ratio |
|---|---|---|---|---|---|
| 1 (Low) | Disengaged | Free | Free | Free | 0.53 |
| 2 | Disengaged | Free | Free | Locked | 0.64 |
| 3 | Disengaged | Free | Locked | Free | 0.74 |
| 4 | Disengaged | Locked | Free | Free | 0.85 |
| 5 | Engaged | Free | Free | Free | 1.0 |
| 6 | Engaged | Free | Free | Locked | 1.22 |
| 7 | Engaged | Free | Locked | Free | 1.42 |
| 8 (High) | Engaged | Locked | Free | Free | 1.62 |

TABLE 2

| Speed | Component Combinations |
|---|---|
| 1 (FIG. 59) | Driver 28 → Pawl 92 → First ring gear 94 → Carrier 86 (first planet gears 88 rotates around first sun gear 72) → Pawl 98 → Hub shell 30 |
| 2 (FIG. 60) | Driver 28 → Pawl 92 → First ring gear 94 → Carrier 86 (first planet gears 88 rotates around first sun gear 72 and second planet gears 90 rotates around fourth Sun Gear 78) → Second ring gear 96 → Roller clutch 166 → Hub shell 30 |
| 3 (FIG. 61) | Driver 28 → Pawl 92 → First ring gear 94 → Carrier 86 (first planet gears 88 rotates around first sun gear 72 and second planet gears 90 rotates around third Sun Gear 76) → Second ring gear 96 → Roller clutch 166 → Hub shell 30 |
| 4 (FIG. 62) | Driver 28 → Pawl 92 → First ring gear 94 → Carrier 86 (first planet gears 88 rotates around first sun gear 72 and second planet gears 90 rotates around second Sun Gear 74) → Second ring gear 96 → Roller clutch 166 → Hub shell 30 |
| 5 (FIG. 63) | Driver 28 → Clutch ring 20 → Carrier 86 → Pawl 98 → Hub shell 30 |
| 6 (FIG. 64) | Driver 28 → Clutch ring 20 → Carrier 86 (second planet gears 90 rotates around fourth Sun Gear 78) → Second ring gear 96 → Roller clutch 166 → Hub shell 30 |
| 7 (FIG. 65) | Driver 28 → Clutch ring 20 → Carrier 86 (second planet gears 90 rotates around third Sun Gear 76) → Second ring gear 96 → Roller clutch 166 → Hub shell 30 |
| 8 (FIG. 66) | Driver 28 → Clutch ring 20 → Carrier 86 (second planet gears 90 rotates around second Sun Gear 74) → Second ring gear 96 → Roller clutch 166 → Hub shell 30 |

A more detailed description of the speeds represented in Table 2 is now provided. In the first speed (speed 1 of the power transmission paths), torque from the chain sprocket S to the driver 28 is transmitted to the first ring gear 94 by the pawls 92. The first ring gear 94 causes the first planet gears 68 to rotate about the fixed first sun gear 72, which in turn cause the carrier 86 to rotate. The carrier 86 then causes the hub shell 30 to rotate via the pawl 98.

In the second speed (speed 2 of the power transmission paths), torque from the chain sprocket S to the driver 28 is transmitted to the first ring gear 94 by the pawls 92. The first ring gear 94 causes the first planet gears 68 to rotate about the fixed first sun gear 72, which in turn cause the carrier 86 to rotate. However, now the fourth sun gear 78 is locked in position by the fourth sun gear pawl 84 (one way rotation). Therefore, the second planet gears 90 rotate about the fourth sun gear 78. The second ring gear 96 is rotated by the second planet gears 90. The second ring gear 96 now causes the hub shell 30 to rotate via the roller clutch 166.

In the third speed (speed 3), torque from the chain sprocket S to the driver 28 is transmitted to the first ring gear 94 by the pawls 92. The first ring gear 94 causes the first planet gears 68 to rotate about the fixed first sun gear 72, which in turn cause the carrier 86 to rotate. The second planet gears 90 now rotate around the third sun gear 76 which is locked in position by the third sun gear pawl 82. Rotation of the second planet gears 90 again causes the second ring gear 96 to rotate. The second ring gear 96 causes the hub shell 30 to rotate via the roller clutch 166.

In the fourth speed (speed 4), torque from the chain sprocket S to the driver 28 is transmitted to the first ring gear 94 by the pawls 92. The first ring gear 94 causes the first planet gears 68 to rotate about the fixed first sun gear 72, which in turn cause the carrier 86 to rotate. The second planet gears 90 now rotate around the second sun gear 74 which is locked in position by the second sun gear pawl 60. Rotation of the second planet gears 90 again causes the second ring gear 96 to rotate. The second ring gear 96 causes the hub shell 30 to rotate via the roller clutch 166.

In the fifth speed (speed 5), the clutch ring 20 now directly couples the driver 28 to the carrier 86. The first ring gear 94 rotates at speeds greater than the driver 28 and the pawls 92 ratchets. In the fifth speed, the carrier 86 causes the hub shell 30 to rotate via the pawl 98.

In the sixth speed (speed 6), torque is transmitted from the driver 28 to the carrier 86 via the clutch ring 20. The fourth sun gear 78 is locked in position by the fourth sun gear pawl 84 (one way rotation). Therefore, the second planet gears 90 rotate about the fourth sun gear 78. The second ring gear 96 is rotated by the second planet gears 90. The second ring gear 96 now causes the hub shell 30 to rotate via the roller clutch 166.

In the seventh speed (speed 7), torque is transmitted from the driver 28 to the carrier 86 via the clutch ring 20. The second planet gears 90 now rotate around the third sun gear 76 which is locked in position by the third sun gear pawl 82. Rotation of the second planet gears 90 again causes the second ring gear 96 to rotate. The second ring gear 96 causes the hub shell 30 to rotate via the roller clutch 166.

In the eighth speed (speed 8), torque is transmitted from the driver 28 to the carrier 86 via the clutch ring 20. The second planet gears 90 now rotate around the second sun gear 74 which is locked in position by the second sun gear pawl 60. Rotation of the second planet gears 90 again causes the second ring gear 96 to rotate. The second ring gear 96 causes the hub shell 30 to rotate via the roller clutch 166.

In the above described configuration of the present invention, the first end 108 of the base sleeve 100 of the pawl control member 18 is welded to the shifting key guide 24 during assembly of the hub assembly 12. Further, the second end 110 is welded to the sleeve guide 22 during assembly of the hub assembly 12. Therefore, the pawl control member 18, the sleeve guide 22 and the shifting key guide 24 all rotate about the hub axle 26 as a single rigid unit. As a result, play or slight relative movement between the pawl control member 18, the sleeve guide 22 and the shifting key guide 24 is completely eliminated. Hence, a cyclist shifting speeds while riding the bicycle 10 has a more comfortable and reliable feel during the speed shifting process.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An internal transmission hub assembly comprising:
    a stationary hub shaft configured to non-rotatably attach to a bicycle frame, the stationary hub shaft defining an axis of rotation;
    a shift control sleeve disposed adjacent to the stationary hub shaft for limited circumferential movement relative to the stationary hub shaft about the axis of rotation, the shift control sleeve configured to control operation of at least one sun gear disposed about the stationary hub shaft, the shift control sleeve including a base sleeve and at least one pawl control arm, the base sleeve having a first end and a second end;
    a sleeve guide rotatably disposed about a first portion of the stationary hub shaft, the sleeve guide supporting the first end of the base sleeve of the shift control sleeve, the first end of the base sleeve is welded to the sleeve guide; and
    a shifting key guide rotatably disposed about a second portion of the stationary hub shaft supporting the second end of the base sleeve of the shift control sleeve, the second end of the base sleeve is welded to the shifting key guide.

2. The internal transmission hub assembly according to claim 1, wherein
    the sleeve guide has a disk-like shape with a central aperture with a portion of the stationary hub shaft extending through the central aperture, and a recess on an outer circumferential portion thereof that is dimensioned to receive the first end of the base sleeve.

3. The internal transmission hub assembly according to claim 1, wherein
the shifting key guide includes a disk-shaped portion includes a central aperture with a portion of the stationary hub shaft extending therethrough, and an opening spaced apart from the central aperture, the opening being dimensioned to receive the second end of the base sleeve.

4. The internal transmission hub assembly according to claim 1, wherein
the shift control sleeve includes at least two pawl control arms, each of the pawl control arms configured to control rotation of a respective pair of sun gears.

5. The internal transmission hub assembly according to claim 1, wherein
the shift control sleeve is configured and arranged to control rotation of three separate sun gears.

6. The internal transmission hub assembly according to claim 1, wherein
the base sleeve of the shift control sleeve has an elongated rod-like shape with the pawl control arm extending perpendicularly from the base sleeve in a circumferential direction relative to the stationary hub shaft.

7. The internal transmission hub assembly according to claim 1, wherein
the base sleeve of the shift control sleeve extends in a direction parallel to the axis of rotation.

* * * * *